United States Patent
Mei et al.

(10) Patent No.: US 7,680,354 B2
(45) Date of Patent: Mar. 16, 2010

(54) IMAGE DEBLUR BASED ON TWO IMAGES

(75) Inventors: Li Mei, Hangzhou (CN); Jin Wang, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 906 days.

(21) Appl. No.: 11/419,733

(22) Filed: May 22, 2006

(65) Prior Publication Data
US 2007/0223831 A1   Sep. 27, 2007

Related U.S. Application Data

(60) Provisional application No. 60/785,106, filed on Mar. 22, 2006, provisional application No. 60/785,109, filed on Mar. 22, 2006.

(51) Int. Cl.
G06K 9/40 (2006.01)
H04N 5/228 (2006.01)

(52) U.S. Cl. ................... 382/255; 348/208.4
(58) Field of Classification Search .......... 382/255
See application file for complete search history.

(56) References Cited

U.S. PATENT DOCUMENTS

| | | | |
|---|---|---|---|
| 2003/0011717 A1* | 1/2003 | McConica | 348/699 |
| 2006/0158523 A1* | 7/2006 | Estevez et al. | 348/208.4 |
| 2006/0187308 A1* | 8/2006 | Lim et al. | 348/208.4 |
| 2006/0279639 A1* | 12/2006 | Silverstein et al. | 348/208.14 |
| 2007/0009169 A1* | 1/2007 | Bhattacharjya | 382/255 |
| 2007/0098383 A1* | 5/2007 | Stavely et al. | 396/55 |

OTHER PUBLICATIONS

Jiaya Jia et al., "Bayesian Correction of Image Intensity with Spatial Consideration," paper, Computer Science Department, Hong Kong University of Science and Technology, 2004, pp. 342-354.
Yu-Wing Tai et al., "Local Color Transfer via Probabilistic Segmentation by Expectation-Maximization," 2005 IEEE, 8 pages.
Erik Reinhard et al., "Color Transfer Between Images," IEEE Computer Graphics and Applications, Sep./Oct. 2001, pp. 34-41.

(Continued)

Primary Examiner—Bhavesh M Mehta
Assistant Examiner—David P Rashid
(74) Attorney, Agent, or Firm—Patent Law Group LLP; David C. Hsia

(57) ABSTRACT

A method includes (a) performing image deblur at the original size of underexposed and normally exposed images when their original image size is small. Otherwise, the method includes (b) downsizing the images and performing image deblur on the downsized images. The image deblur on downsized images includes (c) applying a global color transfer between the images if their difference of average gray values is small. Otherwise, the method includes four successive sub-procedures: (d) histogram customizing of the underexposed image based on the normally exposed image; (e) region segmentation for the histogram-customized underexposed image and local alignment of regions in the histogram-customized underexposed image with the normally exposed image; (f) color tuning for the histogram-customized underexposed image based on the local alignment and a global alignment between the underexposed and the normally exposed images; and (g) local color transfer with multi-size neighbor windows from between the images.

24 Claims, 12 Drawing Sheets

OTHER PUBLICATIONS

Frank Nielsen et al, "On Region Merging: The Statistical Soundness of Fast Sorting, with Applications," 2003 IEEE Conference on Computer Vision and Pattern Recognition (CVPR), pp. II:19-26.

Richard Nock et al., "Statistical Region Merging," IEEE Transactions on Pattern Analysis and Machine Intelligence, vol. 26, No. 11, Nov. 2004, pp. 1-7.

* cited by examiner

IMAGE DEBLUR BASED ON TWO IMAGES

CROSS REFERENCE TO RELATED APPLICATIONS

This application claims the benefit of U.S. Provisional Application No. 60/785,106, and U.S. Provisional Application No. 60/785,109, both entitled "Image Deblur Based on Two Images" and filed on Mar. 22, 2006, which are incorporated herein by reference.

FIELD OF INVENTION

This invention relates to a method for generating an image free of blurring caused by camera shake and/or moving objects from an underexposed image and a normally exposed image.

DESCRIPTION OF RELATED ART

A hot trend in mobile camera and digital camera research is image deblur. Image deblur improves photo clarity by removing blurring introduced by camera shake and moving objects in the scene. There are several related techniques to recover images from a camera when exposure time is above the safe shutter speed. They can be roughly classified into in-process and post-process approaches.

In-process approaches are mainly hardware based techniques, where lens stabilization is by camera shake compensation. Alternatively, CMOS cameras can perform high-speed frame captures within normal exposure time, which allows for multiple image-based motion blur restoration. These methods are able to produce clear and crisp images, given a reasonable exposure time. However, they require specially designed hardware devices.

Post-process methods are mostly motion deblurring techniques. Among them, blind deconvolution is widely adopted to enhance a single blurred image based, under different assumption on the point spread function (PSF) that convolves an original image to create a degraded image. However, the PSF cannot be reliably estimated and the deblurred image may still be distinguished from the actual image.

One paper has suggested a Bayesian approach for image deblur by generating an optimal color mapping function. J. Jia et al., "Bayesian Correction of Image Luminance with Spatial Consideration," Proc. European Conf. Computer Vision, 2004. Another paper has suggested performing local color transfer between corresponding regions of two images for image deblur. Yu-Wing Tai et al., "Local Color Transfer via Probabilistic Segmentation by Expectation Maximization," Computer Vision and Pattern Recognition, 2005. While these techniques have been developed for desktop computers, they are memory intensive and time consuming. Therefore, these methods are not practical for embedded platforms on mobile or handheld devices. Thus, what is needed is a fast and memory efficient method for image deblur that runs robustly and rapidly on common mobile and handheld devices.

BRIEF DESCRIPTION OF THE DRAWINGS

Use of the same reference numbers in different figures indicates similar or identical elements.

SUMMARY

In one embodiment of the invention, a method is provided for image deblur based on two successively captured images where one is underexposed and one is normally exposed. The method recovers a high-quality image by exploiting the tradeoff between exposure time and motion deblur.

In one embodiment, the method includes (a) performing image deblur on the images at their original size when the original image size is small (the max length<320 pixels). Otherwise, the method includes (b) downsizing the images, performing image deblur on the downsized images, and applying local color transfer from the downsized deblurred image to the underexposed image at its original size to create the final deblurred image.

In one embodiment, performing image deblur on the downsized images includes (c) applying a global color transfer from the normally exposed image to the underexposed image if the difference of average gray values between the images is small. Otherwise, performing image deblur on the downsized images includes four successive sub-procedures: (d) histogram customizing of the underexposed image based on the normally exposed image; (e) region segmentation for the histogram-customized underexposed image and local alignment of regions in the histogram-customized underexposed image with the normally exposed image; (f) color tuning for the histogram-customized underexposed image based on the local alignment and a global alignment between the underexposed and the normally exposed images; and (g) local color transfer using multi-size windows from the color-tuned image to the underexposed image.

DETAILED DESCRIPTION

Figure 2:
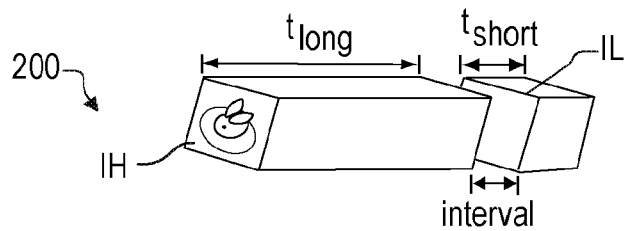
FIG. 2 illustrates the acquisition of underexposed and normally exposed images in one embodiment of the invention.

FIG. 2 illustrates the acquisition of images IH and IL in one embodiment of the invention. A camera successively captures images IH and IL with exposures $t_{long}$ and $t_{short}$ with an interval between the two shots. Image IL is an underexposed image taken under the safe shutter speed, which is assumed to be no slower than the reciprocal of the focal length of the lens in unit of seconds. Image IH is a normally exposed image taken under a slower shutter speed. Images IH and IL can be taken in any order. The interval between the two shots is kept as short as possible in order to minimize the difference between the two images and to maximize the matching of the pixel positions.

Figure 3:
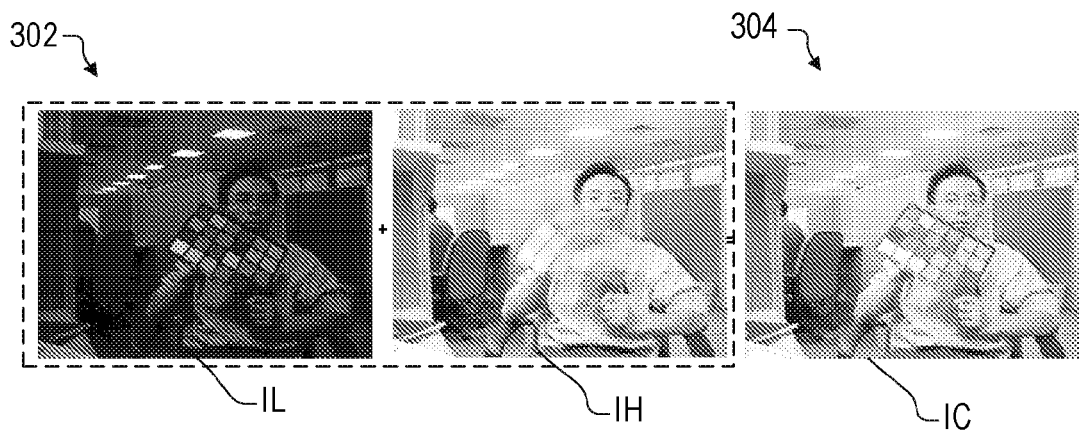
FIG. 3 illustrates the application of the image deblur method of FIG. 1 in one embodiment of the invention.

FIG. 3 illustrates the application of image deblur on two exemplary images IH and IL in a step 302 in one embodiment of the invention. As can be seen, underexposed image IL has no visible blurring but its brightness and color are unnatural. Normally exposed image IH exhibits blurring but its brightness and color are natural. After image deblur in a step 304, a deblurred image IC has no visible blurring and exhibits natural brightness and color.

Figure 1:
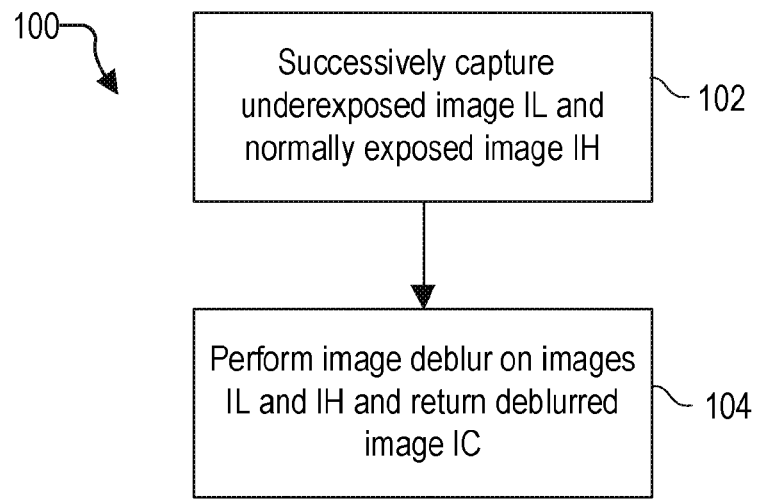
FIG. 1 is a flowchart of a method for image deblur based on two images in one embodiment of the invention.

FIG. 1 is a flowchart of a method 100 for generating deblurred image IC from underexposed image IL and normally exposed image IH. Method 100 is implemented as software executed by an embedded processor on a camera or a mobile device with a camera. Alternatively, method 100 is implemented by any combination of software and hardware.

In step 102, the processor causes the camera to capture images IL and IH in succession.

In step 104, the processor performs image deblur based on images IL and IH. The processor saves the result as deblurred image IC.

Figure 4:
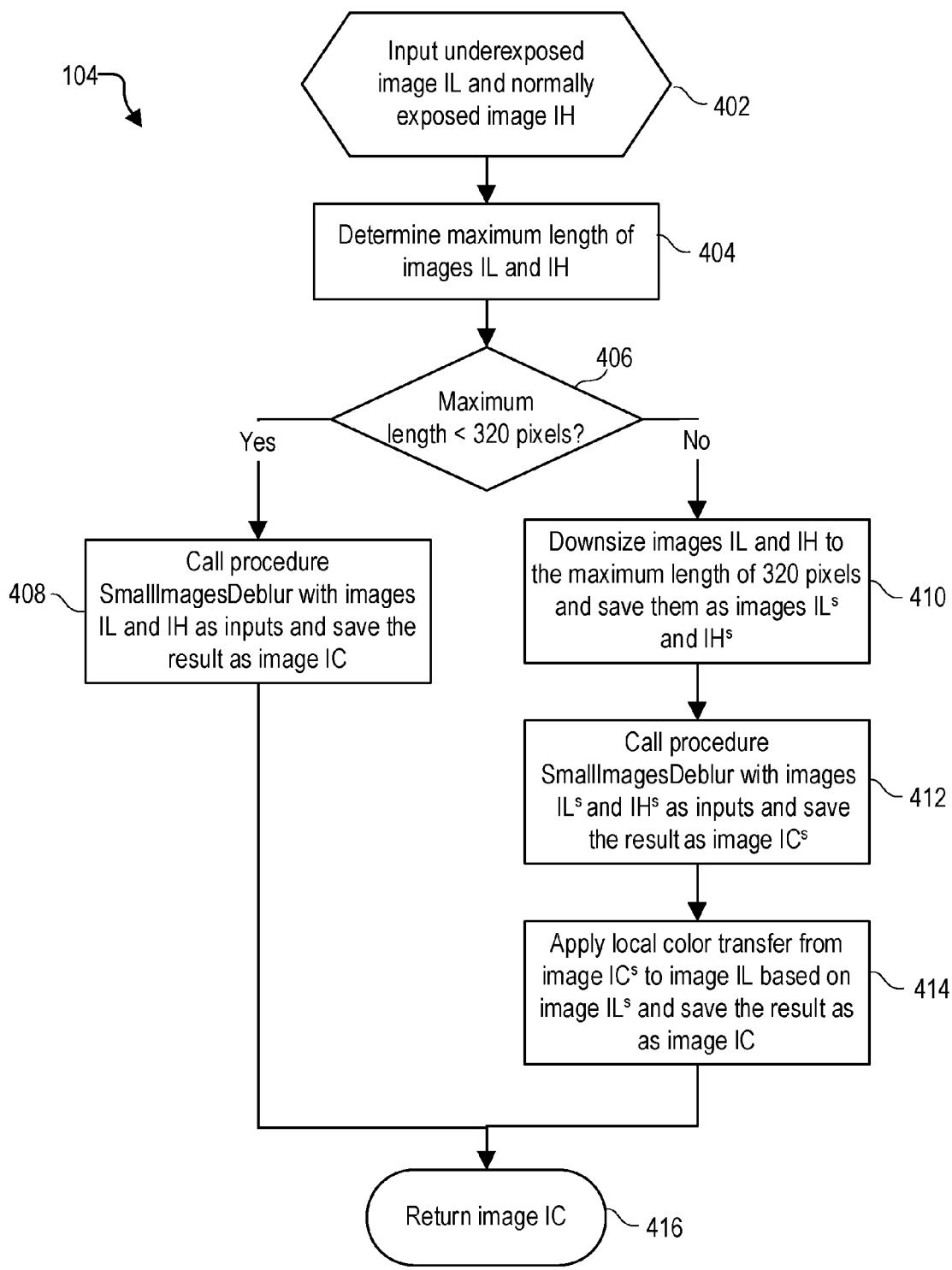
FIG. 4 is a flowchart of a method for image deblur based on two successively exposed images of arbitrary size in one embodiment of the invention.

FIG. 4 illustrates a flowchart of step 104 in one embodiment of the invention.

In step 402, the processor receives images IL and IH. Step 402 is followed by step 404.

In step 404, the processor determines the largest width or height (hereafter "maximum length") of images IL and IH. Step 404 is followed by step 406.

In step 406, the processor determines if the maximum length is less than 320 pixels. If so, then step 406 is followed by step 408. Otherwise step 406 is followed by step 410.

In step 408, the processor calls procedure "SmallImages-Deblur" to process images IL and IH and generate deblurred image IC. One embodiment of procedure SmallImagesDeblur is described later in reference to FIG. 5. Step 408 is followed by step 416.

In step 410, the processor reduces the resolution of images IL and IH to the maximum length of 320 pixels and saves the result as downsized images $IL^s$ and $IH^s$. Step 410 is followed by step 412.

In step 412, the processor calls procedure SmallImagesDeblur to process images $IL^s$ and $IH^s$ and generate a downsized deblurred image $IC^s$. Step 408 is followed by step 414.

In step 414, the processor applies a local color transfer from image $IC^s$ to image IL to generate deblurred image IC at the original size. In contrast to a global color transfer that utilizes a color transfer formula (described later) based on a mean color value and a standard deviation value (i.e., the square root of a variance color value) of all the pixels in the two images, a local color transfer utilizes the color transfer formula based on mean color values and a standard deviation values of neighboring pixels in the two images. One embodiment of step 414 is described later in reference to FIG. 13. Step 414 is followed by step 416.

In step 416, the processor returns deblurred image IC and ends step 104.

Procedure SmallImagesDeblur

Figure 5:
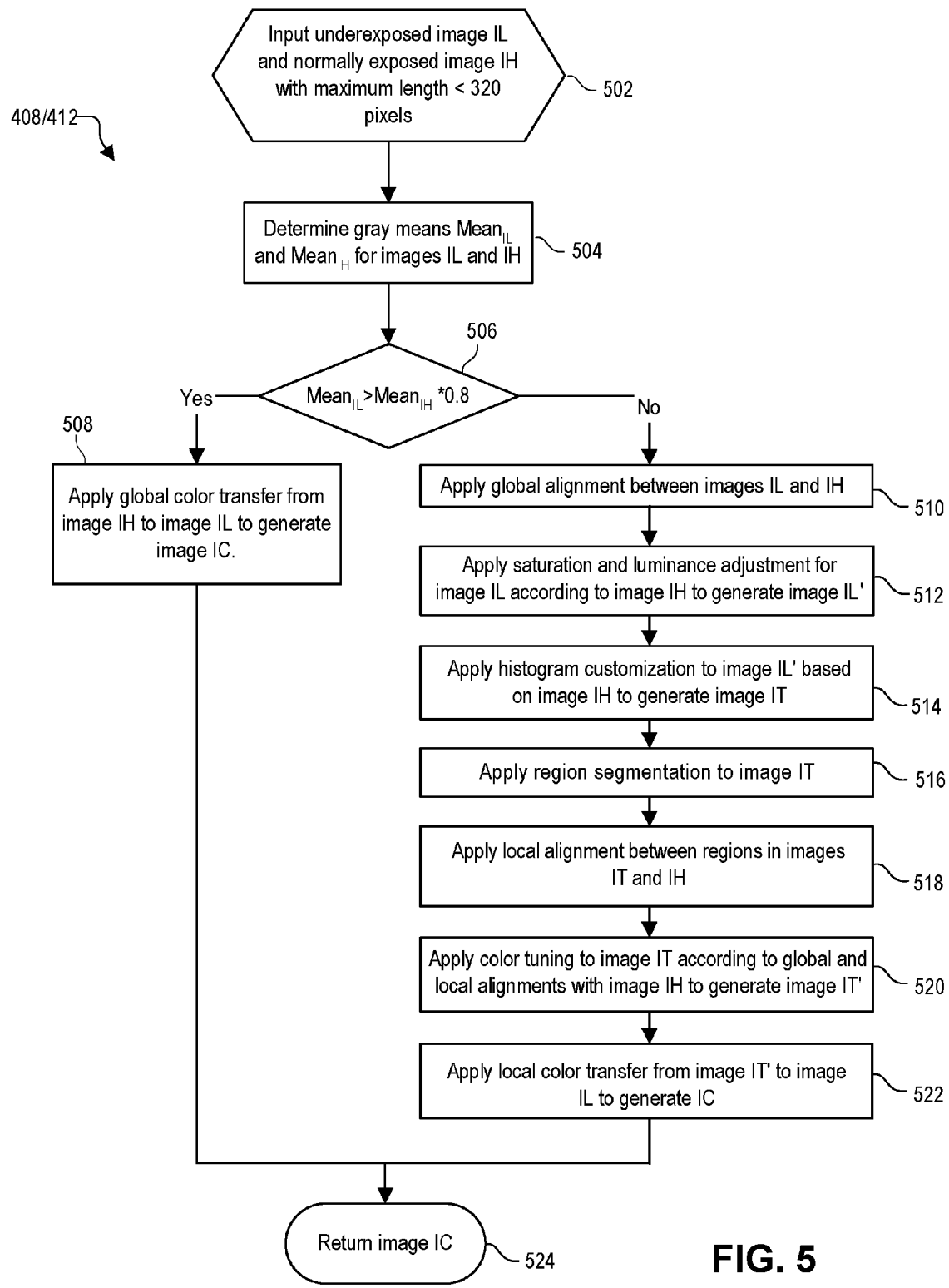
FIG. 5 is a flowchart of a method for image deblur based on two small successive images in one embodiment of the invention.

FIG. 5 is a flowchart of procedure SmallImagesDeblur called by the processor to process two small images (e.g., images IL and IH or images $IL^s$ and $IH^s$) in one embodiment of the invention.

Procedure SmallImagesDeblur includes computing average gray values of the underexposed image and the normally exposed image. If the underexposed image is bright enough, image deblur can be achieved by global color transfer between the two images. Otherwise image deblur can be achieved by 4 successive sub-procedures: (1) histogram customizing from the normally exposed image to the underexposed image; (2) region segmentation and alignment for the histogram-customized underexposed image; (3) color tuning for the histogram-customized underexposed image based on the results of global and local alignments with the normally exposed image; and (4) local color transfer from the color-tuned image to the underexposed image using multi-size neighbor window.

In step 502, the processor receives two images having maximum length of less than 320 pixels. In the following explanation, assume that procedure SmallImagesDeblur has been called to process images IL and IH. Step 502 is followed by step 504.

In step 504, the processor determines gray values of pixels in images IL and IH, and then determines mean gray values $Mean_{IL}$ and $Mean_{IH}$ of images IL and IH, respectively. In one embodiment, gray value of a pixel is calculated as follows:

$$gray = \frac{B \times 117 + G \times 601 + R \times 306}{1024}, \quad (1)$$

where R, G, B are the color values of the pixel in RGB color space. Step 504 is followed by step 506.

In step 506, the processor determines if mean gray value $Mean_{IL}$ is greater than 80% of $Mean_{IH}$. If so, underexposed image IL is bright enough for a global color transfer from image IH to image IL and step 506 is followed by step 508. Otherwise step 506 is followed by step 510.

In step 508, the processor applies a global color transfer from image IH to image IL to generate deblurred image IC. In contrast to a local color transfer that utilizes the color transfer formula based on the mean color values and the standard deviation values (i.e., the square root of the variance color values) of corresponding neighboring pixels in the two images, global color transfer utilizes the color transfer formula based on the mean color value and the standard deviation value of all the pixels in the two images. One embodiment of step 508 is described later in reference to FIG. 6. Step 508 is followed by step 524.

In step 510, the processor applies global alignment between images IL and IH using coarse to fine steps. One embodiment of step 510 is described later in reference to FIG. 7. Step 510 is followed by step 512.

In step 512, the processor converts the color space of image IL from RGB to HSL, and adjusts the saturation and the luminance of image IL based on mean gray values $Mean_{IL}$ and $Mean_{IH}$. The processor then converts the adjusted image IL from HSL back to RGB to generate an image IL'. One embodiment of step 510 is described later in reference to FIG. 8. Step 512 is followed by step 514.

In step 514, the processor applies histogram customization to image IL' based on image IH to generate an image IT. Histogram customization consists of mapping the histogram distribution of image IH to image IL'. One embodiment of step 514 is described later in reference to FIG. 9. Step 514 is followed by step 516.

In step 516, the processor applies region segmentation to image IT to determine how it may be segmented into visually meaningful regions. Region segmentation by region merging is described in "On Region Merging: The Statistical Soundness of Fast Sorting with Applications" by Nielsen et al., 2003 IEEE Conference on Computer Vision and Pattern Recognition, pp. 11: 19-26, and "Statistical Region Merging" by Nock et al., IEEE Transaction on Pattern Analysis and Machine Intelligence, Vol. 26, No. 11, November 2004. Region segmentation returns region number and region index array for each pixel in image IT. Region number indicates the total number of visually meaningful regions. Region index array is used to locate any pixel in the image into one of the visually meaningful regions. There are several advantages for this algorithm. First, the algorithm can be efficiently approximated in linear time/space. Second, simple color space such as RGB can be used. Third, the approach can cope with hard noise corruption. Step 516 is followed by step 518.

In step 518, the processor applies local alignment of the regions in image IT determine din step 516 to regions in image IH using coarse to fine steps. One embodiment of step 518 is described later in reference to FIG. 10. Step 518 is followed by step 520.

In step 520, the processor applies color tuning to image IT based on the results of the global and the local alignments with image IH in steps 510 and 518 to generate a color-tuned image IT'. One embodiment of step 520 is described later in reference to FIG. 11. Step 520 is followed by step 522.

In step 522, the processor applies a local color transfer from image IT' to image IL using a neighbor window at various sizes. The result is saved as deblurred image IC. One embodiment of step 522 is described later in reference to FIG. 12. Step 522 is followed by step 524.

In step 524, the processor returns deblurred image IC and ends step 408.

Global Color Transfer Between Two Images

Figure 6:
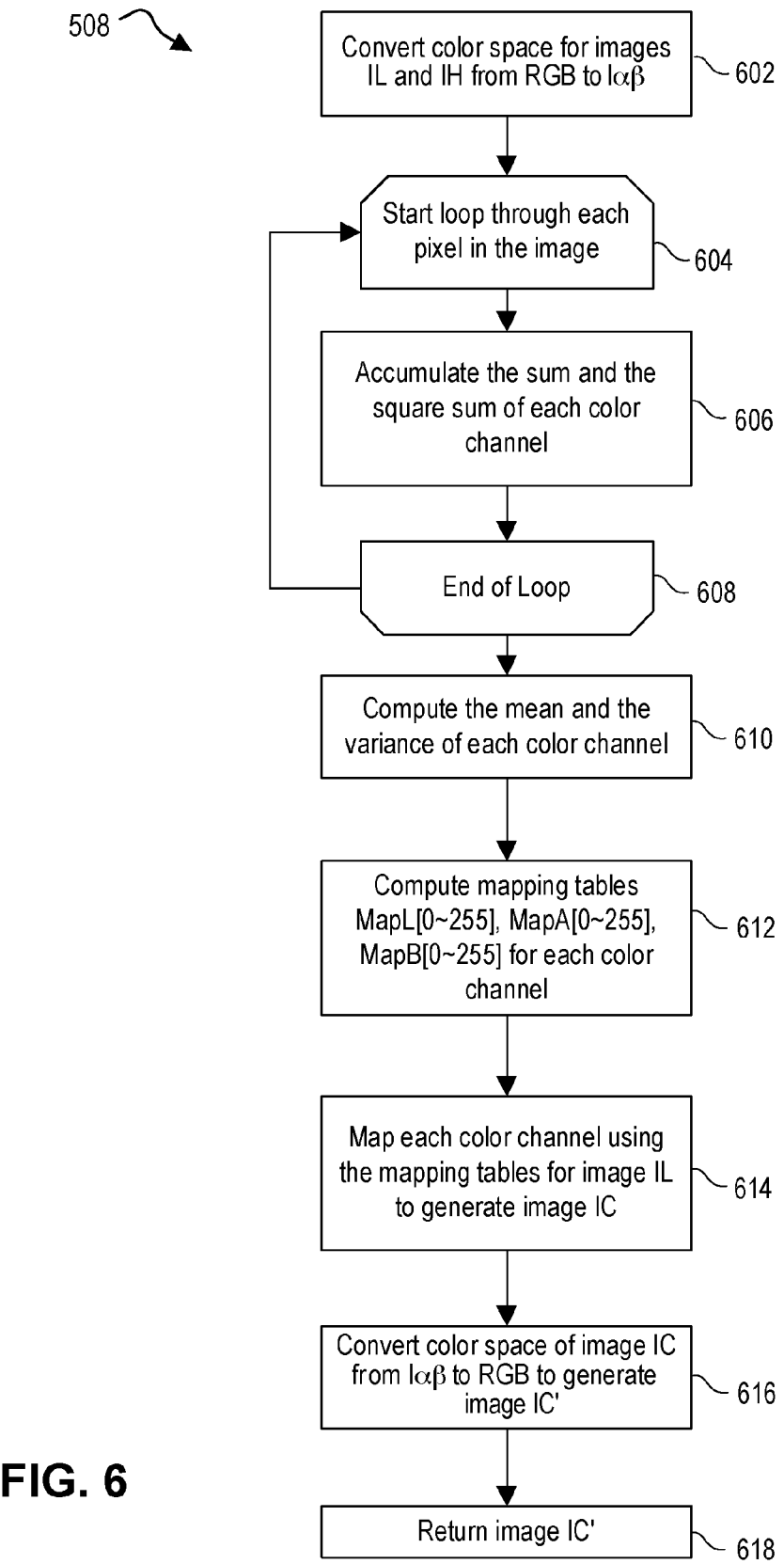
FIG. 6 is a flowchart of a method for global color transfer between two images in one embodiment of the invention.

FIG. 6 is a flowchart of step 508 in one embodiment of the invention.

In step 602, the processor converts color space of images IL and IH from RGB to $l\alpha\beta$. $l\alpha\beta$ color space is described in "Color Transfer between Images" by Reinhard et al, IEEE Applied Perception, September/October 2001. In $l\alpha\beta$ color space, l represents achromatic luminance channel while $\alpha$ and $\beta$ represent yellow-blue and red-green channels, respectively. $l\alpha\beta$ color space minimizes correlation between channels for many natural scenes. Step 602 is followed by step 604.

In step 604, the processor starts to loop through each pixel in images IL and IH. Step 604 is followed by step 606.

In step 606, the processor accumulates the sum and the square sum for each color channel in images IL and IH. For an image $(l_{xy}, \alpha_{xy}, \beta_{xy})$ where $(x=1, 2, \ldots, M; y=1, 2, \ldots, N)$, the sum and the square sum are defined by the formulas below.

$$\left(\sum_{y=1}^{N}\sum_{x=1}^{M} 1_{xy}, \sum_{y=1}^{N}\sum_{x=1}^{M}\alpha_{xy}, \sum_{y=1}^{N}\sum_{x=1}^{M}\beta_{xy}\right); \quad (2)$$

$$\left(\sum_{y=1}^{N}\sum_{x=1}^{M} 1_{xy}^2, \sum_{y=1}^{N}\sum_{x=1}^{M}\alpha_{xy}^2, \sum_{y=1}^{N}\sum_{x=1}^{M}\beta_{xy}^2\right). \quad (3)$$

Step 606 is followed by step 608.

In step 608, the processor determines if it has looped through all the pixels. If not, then step 608 is followed by step 604. Otherwise step 608 is followed by step 610.

In step 610, the processor determines the mean and the variance for each color channel in images IL and IH. Step 610 is followed by step 612.

In step 612, the processor determines mapping tables MapL[0~255], MapA[0~255], and MapB[0~255] for the channels in the $l\alpha\beta$ color space. The processor generates mapping tables MapL, MapA, and MapB using the following color transfer formula:

$$g(C_t) = \mu_s + \frac{\sigma_s}{\sigma_t}(C_t - \mu_t), \quad (4)$$

where $g(C_t)$ is the transferred color of a pixel in the target image (e.g., image IL), $C_t$ is the color of a corresponding pixel in the source image (e.g., image IH), $\mu_s$ and $\mu_t$ are the means of the color in the respective source and target images, $\sigma_s$ and $\sigma_t$ are standard deviations of the color in the respective source and target images. Note that the standard deviations are the square root of the variances determined in step 610.

Suppose the sum and the square sum for color channels $l$, $\alpha$, $\beta$ are $$\left(\sum_{y=1}^{N}\sum_{x=1}^{M} 1_{xy}, \sum_{y=1}^{N}\sum_{x=1}^{M}\alpha_{xy}, \sum_{y=1}^{N}\sum_{x=1}^{M}\beta_{xy}\right)$$

and $$\left(\sum_{y=1}^{N}\sum_{x=1}^{M} 1_{xy}^2, \sum_{y=1}^{N}\sum_{x=1}^{M}\alpha_{xy}^2, \sum_{y=1}^{N}\sum_{x=1}^{M}\beta_{xy}^2\right),$$

then the means for color channels $l$, $\alpha$, $\beta$ are $$\begin{cases} \bar{1} = \dfrac{\sum_{y=1}^{N}\sum_{x=1}^{M} 1_{xy}}{M \times N} \\ \bar{\alpha} = \dfrac{\sum_{y=1}^{N}\sum_{x=1}^{M}\alpha_{xy}}{M \times N}, \\ \bar{\beta} = \dfrac{\sum_{y=1}^{N}\sum_{x=1}^{M}\beta_{xy}}{M \times N} \end{cases} \quad (5)$$

and the standard deviations (i.e., the square root of the variances) for color channels $l$, $\alpha$, $\beta$ are $$\begin{cases} 1^{Var} = \sqrt{\dfrac{\sum\limits_{y=1}^{N}\left(\sum\limits_{x=1}^{M} 1_{xy}^2\right)}{M \times N} - \bar{1}^2} \\ \alpha^{Var} = \sqrt{\dfrac{\sum\limits_{y=1}^{N}\sum\limits_{x=1}^{M} \alpha_{xy}^2}{M \times N} - \bar{\alpha}^2} \\ \beta^{Var} = \sqrt{\dfrac{\sum\limits_{y=1}^{N}\sum\limits_{x=1}^{M} \beta_{xy}^2}{M \times N} - \bar{\beta}^2} \end{cases} \quad (6)$$

$\mu_s$ and $\mu_t$ are 3*1 vector:

$$\mu_s = \begin{Bmatrix} \bar{1}_s \\ \bar{\alpha}_s \\ \bar{\beta}_s \end{Bmatrix}, \mu_t = \begin{Bmatrix} \bar{1}_t \\ \bar{\alpha}_t \\ \bar{\beta}_t \end{Bmatrix}. \quad (7)$$

$\sigma_s$ and $\sigma_t$ are also 3*1 vector:

$$\sigma_s = \begin{Bmatrix} 1_s^{Var} \\ \alpha_s^{Var} \\ \beta_s^{Var} \end{Bmatrix}, \sigma_t = \begin{Bmatrix} 1_t^{Var} \\ \alpha_t^{Var} \\ \beta_t^{Var} \end{Bmatrix}. \quad (8)$$

Step 612 is followed by step 614.

In step 614, the processor maps each color channel of pixels in image IL using mapping tables MapL, MapA, and MapB, and saves the result as deblurred image IC. Step 614 is followed by step 616.

In step 616, the processor converts color space of image IC from lαβ back to RGB and saves the result as deblurred image IC'. Step 616 is followed by step 618.

In step 618, the processor returns image IC' and ends step 508.

Global Image Alignment

Figure 7:
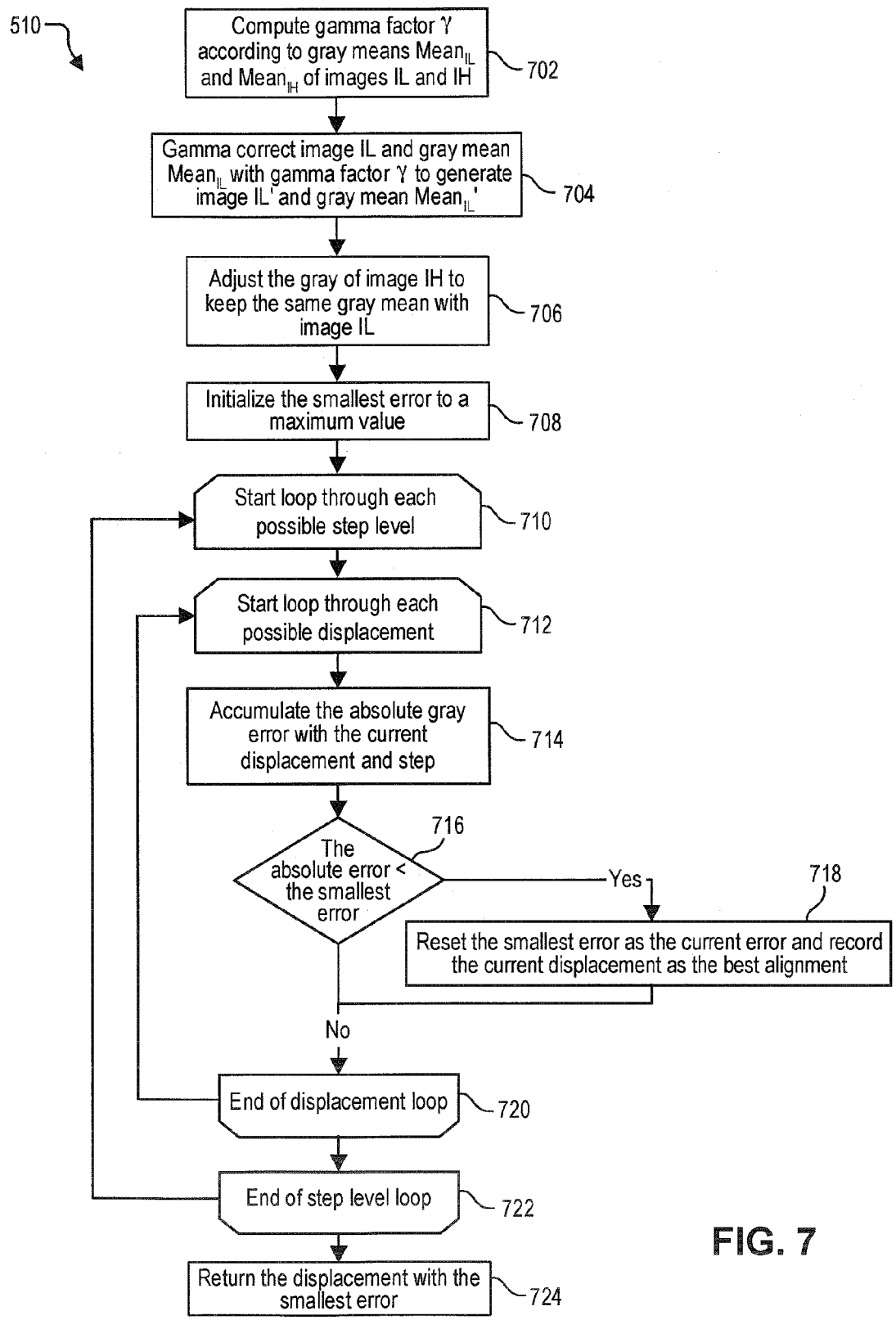
FIG. 7 is a flowchart of a method for global alignment between two images in one embodiment of the invention.

FIG. 7 illustrates a flowchart of step 510 in one embodiment of the invention.

In step 702, the processor determines a gamma correction factor γ from the mean gray values Mean$_{IL}$ and Mean$_{IH}$ determined in step 504 (FIG. 5). In one embodiment, gamma correction factor γ is defined as follows:

$$\gamma = 1.0 + \dfrac{Mean_{IH} - Mean_{IL}}{Mean_{IL} \times 20} + \dfrac{\text{Max}\left(1.0, \dfrac{(42 - Mean_{IL}) * Mean_{IH}}{Mean_{IL}}\right)}{200}. \quad (9)$$

Note that gamma correction factor γ is always greater than 1.0 so it brightens image IL and mean gray value Mean$_{IL}$ in step 704. Step 702 is followed by step 704.

In step 704, the processor applies gamma correction to image IL to generate a brighten image IL'. In one embodiment, each RGB channel is gamma corrected using a gamma table having a range [0~255] defined as follows:

$$GammaTable[i] = \dfrac{\left(i^{\frac{1}{\gamma}}\right)}{255^{\frac{1}{\gamma}}} \times 255, (i = 0, 1, \ldots, 255), \quad (10)$$

where Gamma Table [i] is the gamma corrected color of a pixel in the target image (e.g., image IL'), and i is the color of a corresponding pixel in the source image (e.g., image IL).

The processor also applies gamma correction to mean gray value Mean$_{IL}$ using formula (10) to generate a mean gray value Mean$_{IL'}$. Step 704 is followed by step 706.

In step 706, the processor adjusts the gray values of image IH so images IH and IL have the same mean gray value. Specifically, for each pixel in image IH, the processor adds (Mean$_{IL'}$−Mean$_{IH}$) to its gray value. Note that the gray values of the pixels in image IH were determined in step 504 (FIG. 5) and the gray values of the pixels in image IL were determined in step 704. Step 706 is followed by step 708.

In step 708, the processor initializes a smallest error variable to a maximum value. Step 708 is followed by step 710.

In step 710, the processor starts to loop through each possible step level. In one embodiment, the step levels are defined as follows:

1$^{st}$ Level: search range: $\begin{cases} x \in [-30, 30] \\ y \in [-30, 30] \end{cases}$ and search step = 5 pixels ⇒ best alignment (bestX1, bestY1).

2$^{nd}$ Level: search range: $\begin{cases} x \in [bestX1 - 3, bestX1 + 3] \\ y \in [bestY1 - 3, bestX1 + 3] \end{cases}$ and search step = 3 pixels ⇒ best alignment (bestX2, bestY2).

3$^{rd}$ Level: search range: $\begin{cases} x \in [bestX2 - 2, bestX1 + 2] \\ y \in [bestY2 - 2, bestX1 + 2] \end{cases}$ and search step = 2 pixels ⇒ best alignment (bestX3, bestY3).

4$^{th}$ Level: search range: $\begin{cases} x \in [bestX3 - 1, bestX3 + 1] \\ y \in [bestY3 - 1, bestX3 + 1] \end{cases}$ and search step = 1 pixel ⇒ best alignment (bestX, bestY).

(bestX, bestY) is the best global alignment. Step 710 is followed by step 712.

In step 712, the processor starts to loop through each possible displacement at the current step level within the current search range. Step 712 is followed by step 714.

In step 714, the processor determines an absolute gray error at the current displacement and the current step level by summing absolute gray errors of corresponding pixels in images IH and IL at the current displacement and the current step. Step 714 is followed by step 716.

In step 716, the processor determines if the absolute gray error is less than the smallest error. If so, then step 716 is followed by step 718. Otherwise step 716 is followed by step 720.

In step 718, the processor sets the smallest error as the current absolute gray error and records the current displacement as the best alignment. Step 718 is followed by step 720.

In step 720, the processor determines if it has tried all the possible displacements at the current step level. If not, then step 720 is followed by step 712. Otherwise step 720 is followed by step 722.

In step 722, the processor determines if it has tried all the possible step levels. If not, then step 722 is followed by step 710 where the processor uses the best alignment of the current step level as the starting point in the next step level. Otherwise step 722 is followed by step 724.

In step 724, the processor returns the displacement with the smallest absolute gray error as the best alignment between images IL and IH and ends step 510.

Saturation and Luminance Adjustment for the Underexposed Image

Figure 8:
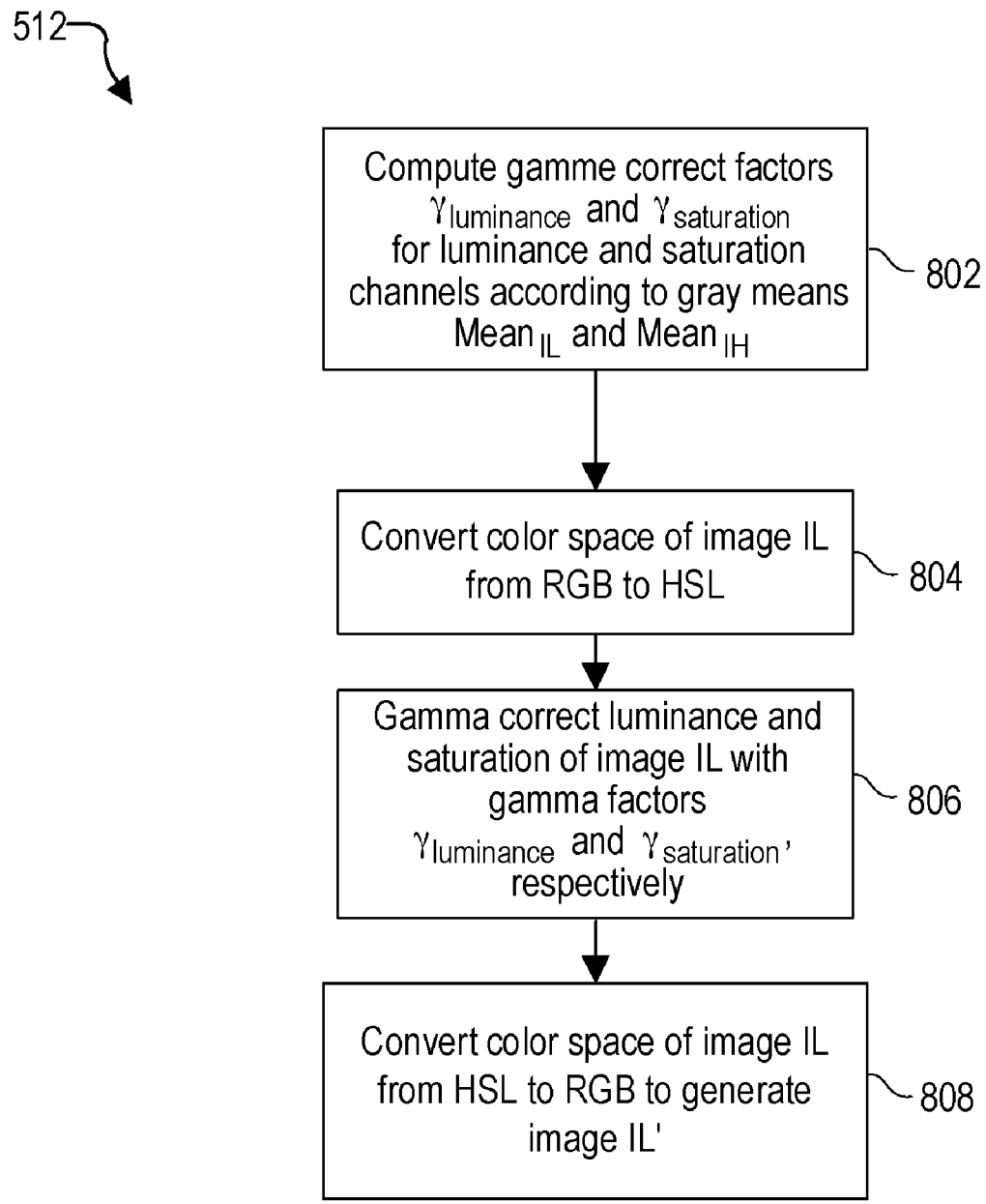
FIG. 8 is a flowchart of a method for tuning saturation and luminance of an underexposed image in one embodiment t of the invention.

FIG. 8 is a flowchart of step 512 in one embodiment of the invention. Step 512 seeks to provide vivid color restoration in image deblur by adjusting saturation and luminance from the normally exposed to the underexposed image prior to histogram customization in step 514.

In step 802, the processor determines gamma correct factors $\gamma_{luminance}$ and $\gamma_{saturation}$ for luminance and saturation channels based on mean gray values $Mean_{IL}$ and $Mean_{IH}$ determined in step 504 (FIG. 5) and gamma factor γ is determined in step 702 (FIG. 7). In one embodiment, gamma correct factors $\gamma_{luminance}$ and $\gamma_{saturation}$ are determines as follows:

$$\gamma_{luminance} = 1.0 + \frac{Mean_{IH} - Mean_{IL}}{Mean_{IH} \times 1.25}, \quad (11)$$

$$\gamma_{saturation} = \min\left(1.23, \frac{\gamma - 1.0}{3.0} + 1.0\right). \quad (12)$$

Step 802 is followed by step 804.

In step 804, the processor converts the color space of image IL from RGB to HSL. Step 804 is followed by step 806.

In step 806, the processor applies gamma correction to the luminance and the saturation of image IL using formula (10) with gamma factors $\gamma_{luminance}$ and $\gamma_{saturation}$, respectively. Step 806 is followed by step 808.

In step 808, the processor converts the color space of image IL from HSL back to RGB and saves the result as gamma-corrected image IL'.

Histogram Customization

Figure 9:
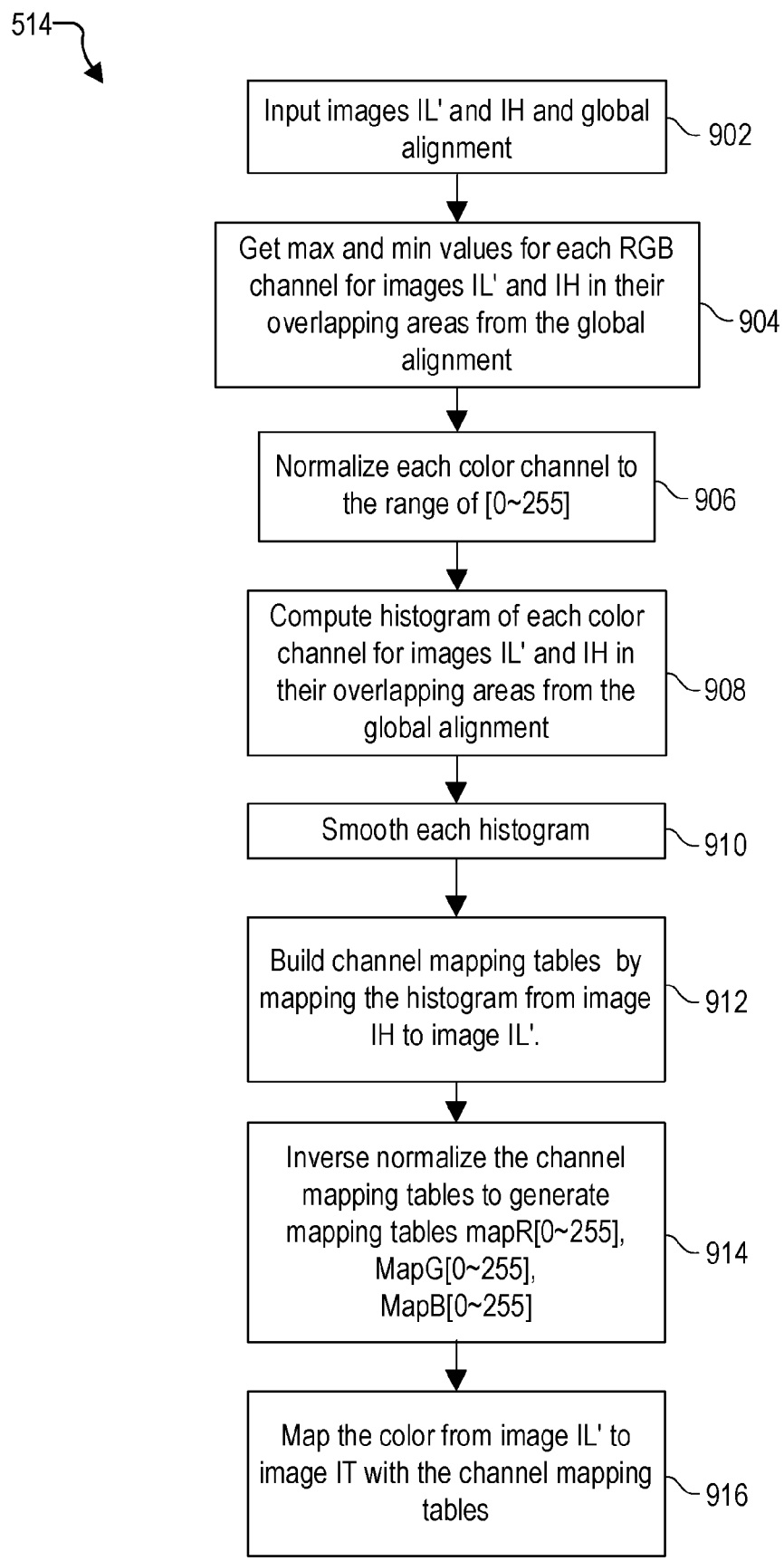
FIG. 9 is a flowchart of a method for histogram customization of an underexposed image based on a normally exposed image in one embodiment of the invention.

FIG. 9 is a flowchart of step 514 in one embodiment of the invention. Step 514 provides histogram customization, which compares corresponding channel-level (R, G, B) histograms of images IH and IL' and computes channel mapping functions using histogram specification to map image IH to image IL' to generate image IT. Histogram specification is a conventional image processing method that maps the histogram distribution of one image to that of another image so their histogram distributions are consistent.

In step 902, the processor receives images IL' and IH and their best global alignment positions. Step 902 is followed by step 904.

In step 904, the processor determines the maximum and minimum values of each channel of images IL' and IH in the RGB color space within the overlap area between images IL' and IH at their best global alignment positions. Step 904 is followed by step 906.

In step 906, the processor normalizes each channel to a range of [0~255] based on the maximum and the minimum values of the channel. Normalization is defined as R'=R*255/(maxR−minR), where R' is the normalized value of a color, R is the original value of the color, maxR is the maximum value of the color, and minR is the minimum value of the color. Step 906 is followed by step 908.

In step 908, the processor determines histogram of each channel for images IL' and IH within their overlap area. Step 908 is followed by step 910.

In step 910, the processor smoothes out each histogram with a 3-neighborhood Gaussian blur. Step 910 is followed by step 912.

In step 912, the processor builds channel mapping table that map the histograms of image IH to the histograms of image IL' by histogram specification. Step 912 is followed by 914.

In step 914, the processor inverse normalizes each channel mapping table to generate mapping tables mapR[0~255], mapG[0~255], mapB[0~255]. Inverse normalization is defined as R=R'*(maxR−minR)/255. Step 914 is followed by step 916.

In step 916, the processor uses mapping tables mapR[0~255], mapG[0~255], and mapB[0~255] to map the colors of image IL' to generate image IT.

Local Alignment for Regions

Figure 10:
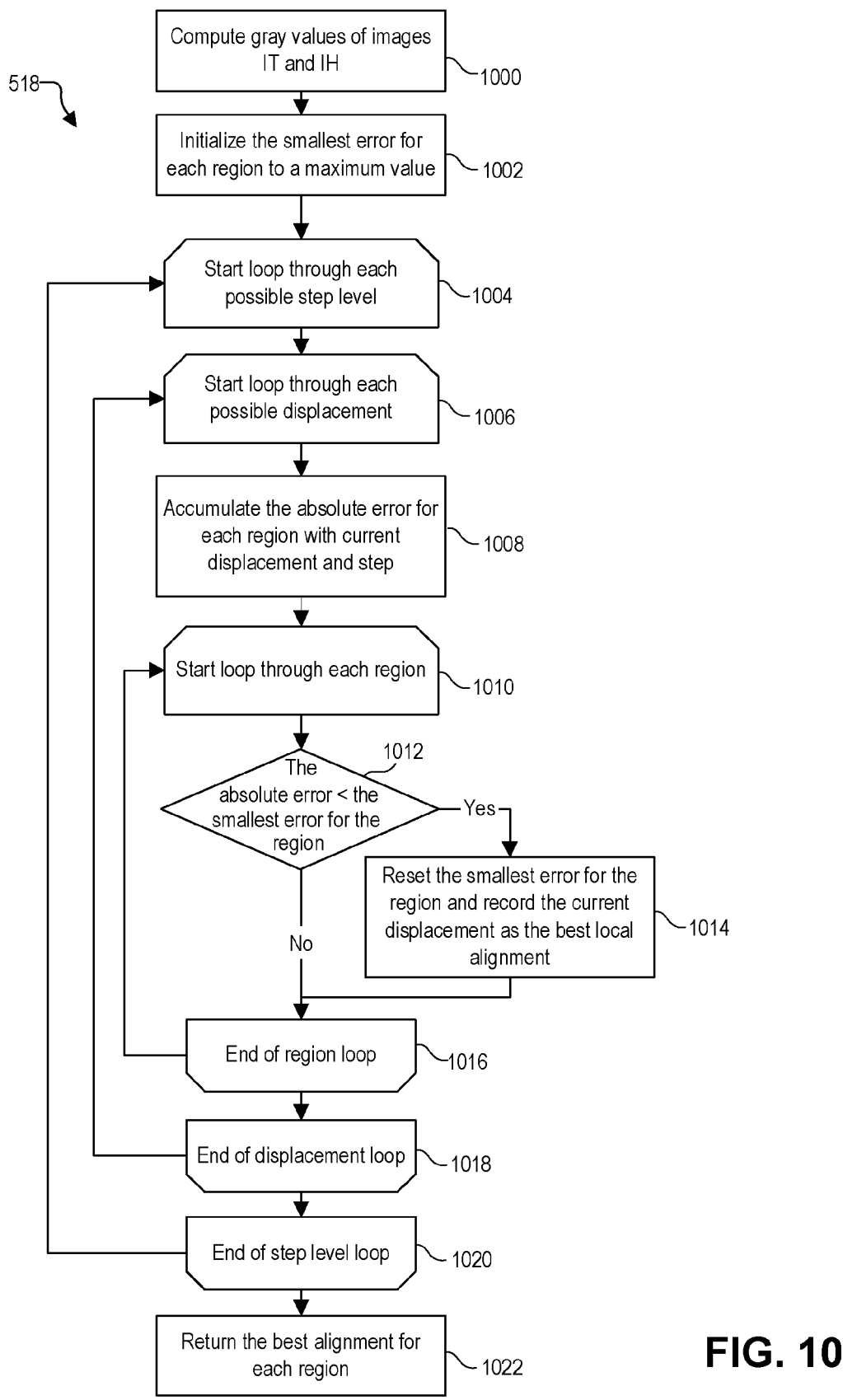
FIG. 10 is a flowchart of a method for local alignment between regions of two images in one embodiment of the invention.

FIG. 10 is a flowchart of step 518 in one embodiment of the invention. Step 518 for local alignment is similar to step 510 (FIG. 7) for global alignment with an additional loop through each region.

In step 1000, the processor determines the gray value of each pixel in images IT and IH. Step 1000 is followed by step 1002.

In step 1002, the processor initializes the value of the smallest error of each region in image IT to a maximum value. The regions of image IT were previously determined in step 516 (FIG. 5). Step 1002 is followed by step 1004.

In step 1004, the processor starts to loop through each possible step level. The step sizes and the search ranges for each step level are the same as those in step 510 (FIG. 7) described above. Step 1004 is followed by step 1006.

In step 1006, the processor starts to loop through each possible displacement. Step 1006 is followed by step 1008.

In step 1008, the processor determines an absolute gray error for each region at the current displacement and the current step level within the current search range by summing absolute gray errors between corresponding pixels in each region at the current displacement and the current step. Step 1008 is followed by step 1010.

In step 1010, the processor starts to loop through each region. Step 1010 is followed by step 1012.

In step 1012, the processor determines if the absolute gray error for the current region is less than the smallest error for the current region. If so, then step 1012 is followed by step 1014. Otherwise, step 1012 is followed by step 1016.

In step 1014, the processor sets the smallest error for the current region to the absolute gray error of the current region and the saves the current displacement as the best local alignment for the current region. Step 1014 is followed by step 1016.

In step 1016, the processor determines if it has tried all the regions. If not, then step 1016 is followed by step 1010. Otherwise step 1016 is followed by step 1018.

In step 1018, the processor determines if it has tried all displacements. If not, then step 1018 is followed by step 1006. Otherwise step is followed by step 1020.

In step 1020, the processor determines if it has tried all step levels. If not, then step 1020 is followed by step 1004 where the processor uses the best alignment of the current step level as the starting point in the next step level. Otherwise step 1020 is followed by step 1022.

In step 1022, the processor returns the best local alignment for each region.

Color Tuning

Figure 11:
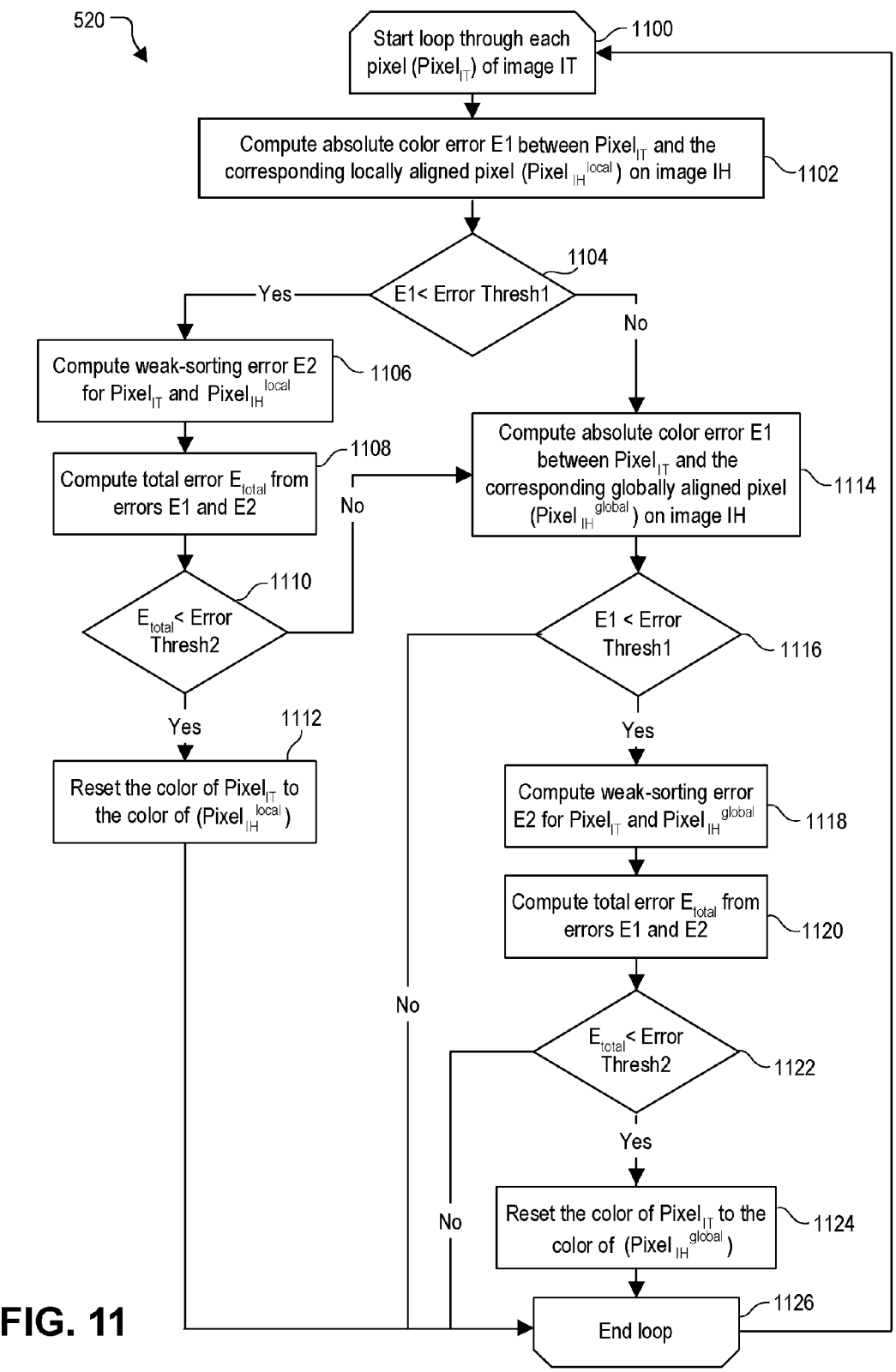
FIG. 11 is a flowchart of a method for generating a small deblurred image by color filling in one embodiment of the invention.

FIG. 11 is a flowchart of step 520 in one embodiment of the invention. As described above, step 520 (FIG. 5) applies color tuning to image IT based on the results of the global and the local alignments with image IH in steps 510 and 518 (FIG. 5). For color tuning, each pixel $P_t(R_t, G_t, B_t)$ in image IT is compared against its locally aligned pixel $P_{local}(R_{local}, G_{local}, B_{local})$ and its globally aligned pixel $P_{global}(R_{global}, G_{global}, B_{global})$. If the color between pixels $P_t$ and $P_{local}$ or $P_{global}$ is similar enough, then the color of pixel $P_t$ is filled with the most similar color between the local and the global alignments.

Two error components are used to score the color similarity between a target pixel $P_t(R_t, G_t, B_t)$ and a source pixel $P_s(R_s, G_s, B_s)$, which is either $P_{local}(R_{local}, G_{local}, B_{local})$ or $P_{global}(R_{global}, G_{global}, B_{global})$. The first error component is the absolute color error, which is defined as $E1=|R_s-R_t|+|G_s-G_t|+|B_s-B_t|$. If absolute color error E1 is less than a first error threshold, then the two pixels are assumed to be similar. Since the first component can be easily satisfied (i.e., it is a weak sorter), the second error component is computed to confirm the result of the first error component.

The second error component is the weak-sorting error E2, which is defined as:

$$E2 = \text{sign}(C_s^1 * 2 - C_s^2 - C_s^3) + \text{sign}(C_s^1 + C_s^2 - C_s^3 * 2), \text{ where} \quad (13.1)$$

$$\text{sign}(x) = \begin{cases} 1, \text{ if } x \geq 0 \\ 0, \text{ Otherwise} \end{cases}. \quad (13.2)$$

Components $(R_t, G_t, B_t)$ are sorted in descending order and rewritten as $(C^1_t, C^2_t, C^3_t)$, and components of $(R_s, G_s, B_s)$ are sorted in the same corresponding order and rewritten as $(C^1_s, C^2_s, C^3_s)$. For example, assume $(R_t, G_t, B_t)=(3, 2, 1)$ and $(R_s, G_s, B_s)=(4, 5, 6)$, then they are sorted as $(C^1_t, C^2_t, C^3_t)=(1, 2, 3)$ and $(C^1_s, C^2_s, C^3_s)=(6, 5, 4)$.

The total error is defined as the combination of E1 and E2:

$$E_{total}=(3-E2)*E1. \quad (14)$$

With the error definition above, the rule of color tuning is define as follows.

If the total error between $P_t$ and $P_{local}$ is less than an error threshold, the color of pixel $P_t$ is filled with color $(R_{local}, G_{local}, B_{local})$. Otherwise, the total error between pixels $P_t$ and $P_{global}$ is computed. If the total error between pixels $P_t$ and $P_{global}$ is less than another error threshold, then the color of pixel $P_t$ is filled with color $(R_{global}, G_{global}, B_{global})$. Otherwise the color of pixel $P_t$ remains unchanged. After color tuning image IT, the result is saved as image IT'.

In step 1100, the processor starts to loop through each pixel ($\text{Pixel}_{IT}$) of image IT. Step 1100 is followed by step 1102.

In step 1102, the processor determines the absolute color error E1 between $\text{Pixel}_{IT}$ and the corresponding locally aligned pixel ($\text{Pixel}_{IH}^{Local}$) on image IH. Step 1102 is followed by step 1104.

In step 1104, the processor determines if the absolute color error is less than the Error Thresh1. If not, then step 1104 is followed by step 1106. Otherwise step 1104 is followed by step 1114. In one embodiment, Error Thresh1 is defined as follows:

$$\text{ErrorThresh1}=\min(60,(255-(R_{IL}+G_{IL}+B_{IL})/3)/3). \quad (15)$$

In step 1106, the processor determines weak-sorting error E2 for $\text{Pixel}_{IT}$ and $\text{Pixel}_{IH}^{Local}$. Step 1106 is followed by step 1108.

In step 1108, the processor determines total error $E_{total}$ from errors E1 and E2. Step 1108 is followed by step 1110.

In step 1110, the processor determines if total error $E_{total}$ is less than Error Thresh2. If so, then step 1110 is followed by step 1112. Otherwise step 1110 is followed by step 1114. In one embodiment, Error Tresh2 is defined as same as Error Tresh1.

In step 1112, the processor sets the color of $\text{Pixel}_{IT}$ equal to the color of $\text{Pixel}_{IH}^{Local}$. Step 1112 is followed by step 1126.

In step 1114, the processor determines absolute color error E1 between $\text{Pixel}_{IT}$ and the corresponding globally aligned pixel ($\text{Pixel}_{IH}^{global}$) on image IH. Step 1114 is followed by step 1116.

In step 1116, the processor determines if absolute color error E1 is less than Error Thresh1. If so, then step 1116 is followed by step 1118. Otherwise step 1116 is followed by step 1126.

In step 1118, the processor determines weak-sorting error E2 for $\text{Pixel}_{IT}$ and $\text{Pixel}_{IH}^{global}$. Step 1118 is followed by step 1120.

In step 1120, the processor determines total error $E_{total}$ from errors E1 and E2. Step 1120 is followed by step 1122.

In step 1122, the processor determines if total error $E_{total}$ is less than Error Thresh2. If so, then step 1122 is followed by step 1124. Otherwise step 1122 is followed by step 1126.

In step 1124, the processor sets the color of $\text{Pixel}_{IT}$ equal to the color of $\text{Pixel}_{IH}^{global}$. Step 1124 is followed by step 1126.

In step 1126, the processor determines if it has tried all the pixels in image IT. If not, then step 1126 is followed by step 1100. Otherwise the processor ends step 520.

Local Color Transfer Between Two Images (Small Size) by Tumbling Processing

Figure 12:
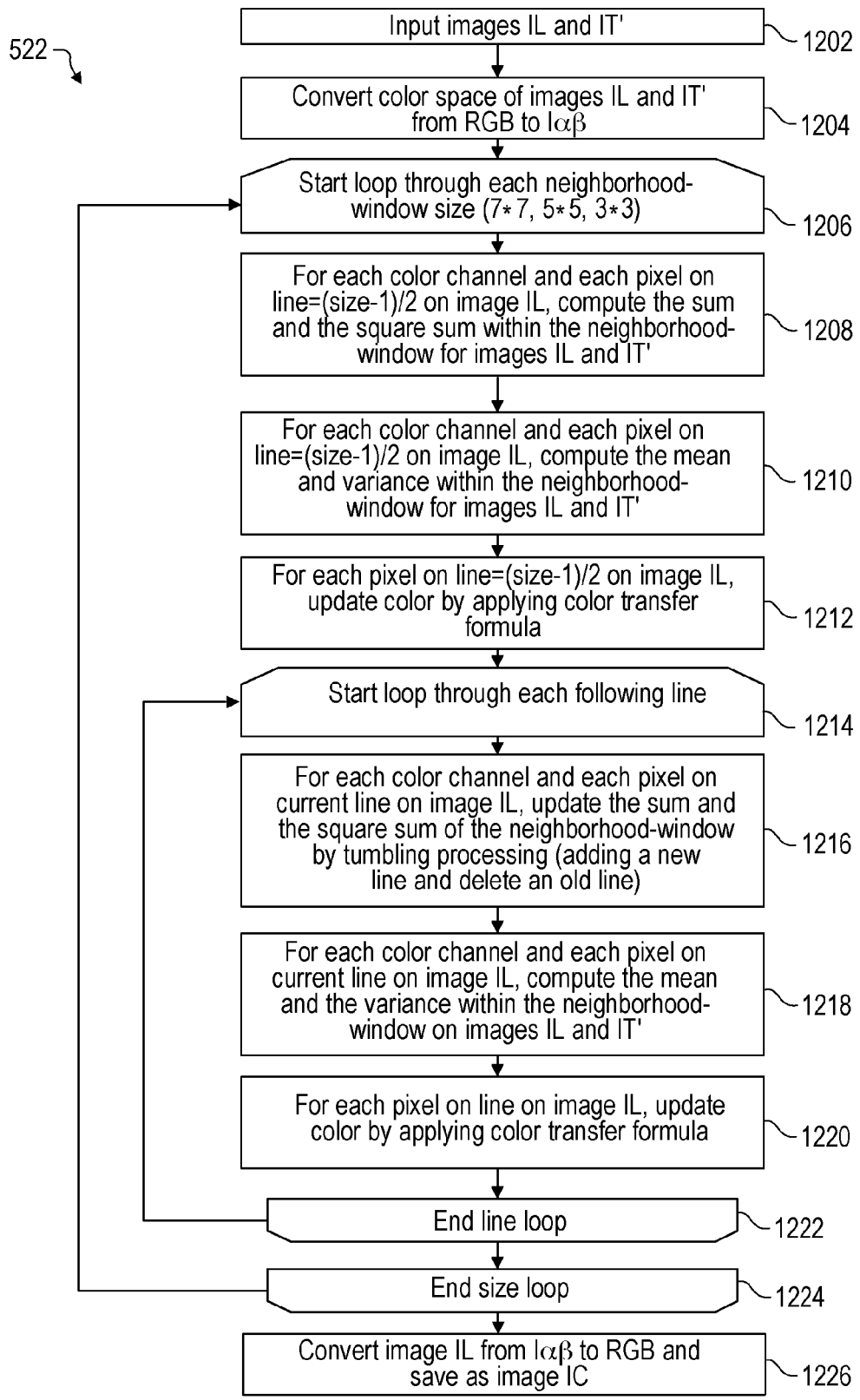
FIG. 12 is a flowchart of a method for local color transfer between two small images in one embodiment of the invention.

FIG. 12 is a flowchart of step 522 (FIG. 5) for the local color transfer from the color-tuned deblurred image IT' to underexposed image IL.

In step 1202, the processor receives images IL and IT'. Step 1202 is followed by step 1204.

In step 1204, the processor converts the color space of images IL and IT' from RGB to $l\alpha\beta$. Step 1204 is followed by step 1206.

In step 1206, the processor starts to loop through each neighborhood-window size. In one embodiment, the processor loops from large to small neighborhood-window sizes such as 7*7, 5*5, and 3*3. By looping through the various neighborhood-window sizes, color transitions are smoothed while image details are preserved. Step 1206 is followed by step 1208.

In step 1208, the processor computes, for each pixel on a line=(size-1)/2 in image IL, the sum and the square sum of each color channel within the current neighborhood-window of images IL and IT'.

For example, the size of neighborhood window=7*7 (i.e. size=7). Then, the first valid row=(size-1)/2=3. For each pixel $\text{Pixel}_{x0,y0}$ on row=3, the sum and square sum in its 7*7 neighborhood-window is computed by accumulation as follows:

$$\left(\sum_{y=y0-3}^{y0+3}\sum_{x=x0-3}^{x0+3} 1_{xy}, \sum_{y=y0-3}^{y0+3}\sum_{x=x0-3}^{x0+3} \alpha_{xy}, \sum_{y=y0-3}^{y0+3}\sum_{x=x0-3}^{x0+3} \beta_{xy}\right), \quad (16)$$

$$\left(\sum_{y=y0-3}^{y0-3}\sum_{x=x0-3}^{x0+3} 1_{xy}^2, \sum_{y=y0-3}^{y0-3}\sum_{x=x0-3}^{x0+3} \alpha_{xy}^2, \sum_{y=y0-3}^{y0-3}\sum_{x=x0-3}^{x0+3} \beta_{xy}^2\right). \quad (17)$$

Note that the processor skips pixels in the first three (0 to 2) and the last three rows (height-3 to height-1), and the first three columns (0 to 2) and the last three columns (width-3 to width−1) because a neighborhood-window centered about a pixel in those rows or columns would have missing pixels. Step 1208 is followed by step 1210.

In step 1210, the processor computes, for each pixel on line=(size−1)/2 in image IL, the mean and the variance of each color channel within the current neighborhood-window of images IL and IT'. Step 1210 is followed by step 1212.

In step 1212, the processor updates the color of each pixel on line=(size−1)/2 in image IL by applying color transfer formula (4) described above, where image IT' is the source image and image IL is the target image. Step 1212 is followed by step 1214.

In step 1214, the processor starts to loop through subsequent lines in image IL. Step 1214 is followed by step 1216.

In step 1216, the processor computes, for each pixel on the current line in image IL, the sum and the square sum of each color channel within the current neighborhood-window of images IL and IT' by a tumbling processing. In the tumbling process, the processor adds the sums and the square sums of a new line and subtracts the sums and the square sums of an old line to get the sums and the square sums of the neighborhood window. Step 1216 is followed by step 1218.

In step 1218, the processor computes, for each pixel on the current line in image IL, the mean and the variance of each color channel within the current neighborhood-window of images IL and IT'. Step 1218 is followed by step 1220.

In step 1220, the processor updates the color of each pixel on the current line in image IL by applying color transfer formula (4) described above, where image IT' is the source image and image IL is the target image. Step 1220 is followed by step 1222.

In step 1222, the processor determines if it has looped through all the lines. If not, then step 1222 is followed by step 1214. Otherwise step 1222 it is followed by step 1214.

In step 1224, the processor determines if it has looped through all the neighborhood-window sizes. If not, then step 1224 is followed by step 1206. Otherwise step 1224 is followed by step 1226.

In step 1226, the processor converts the color space of image IL from $l\alpha\beta$ back to RGB, saves the result as image IC, and then ends step 522.

Local Color Transfer from Small Size Image to Large Size Image

Figures 13, 13A, 13B:
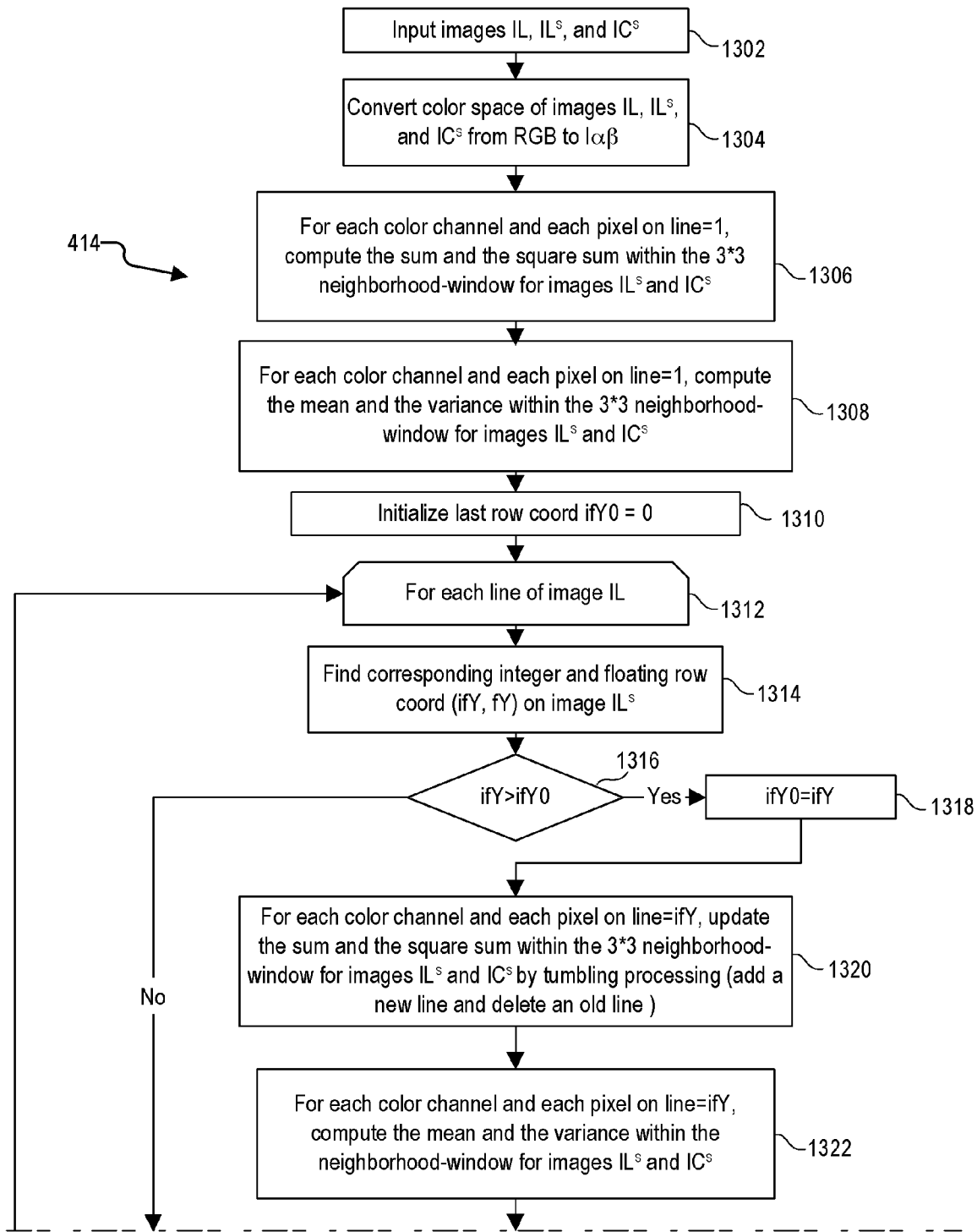
FIG. 13 is a flowchart of a method for local color transfer between a large underexposed image and a small deblurred image in one embodiment of the invention.
Figure 13B:
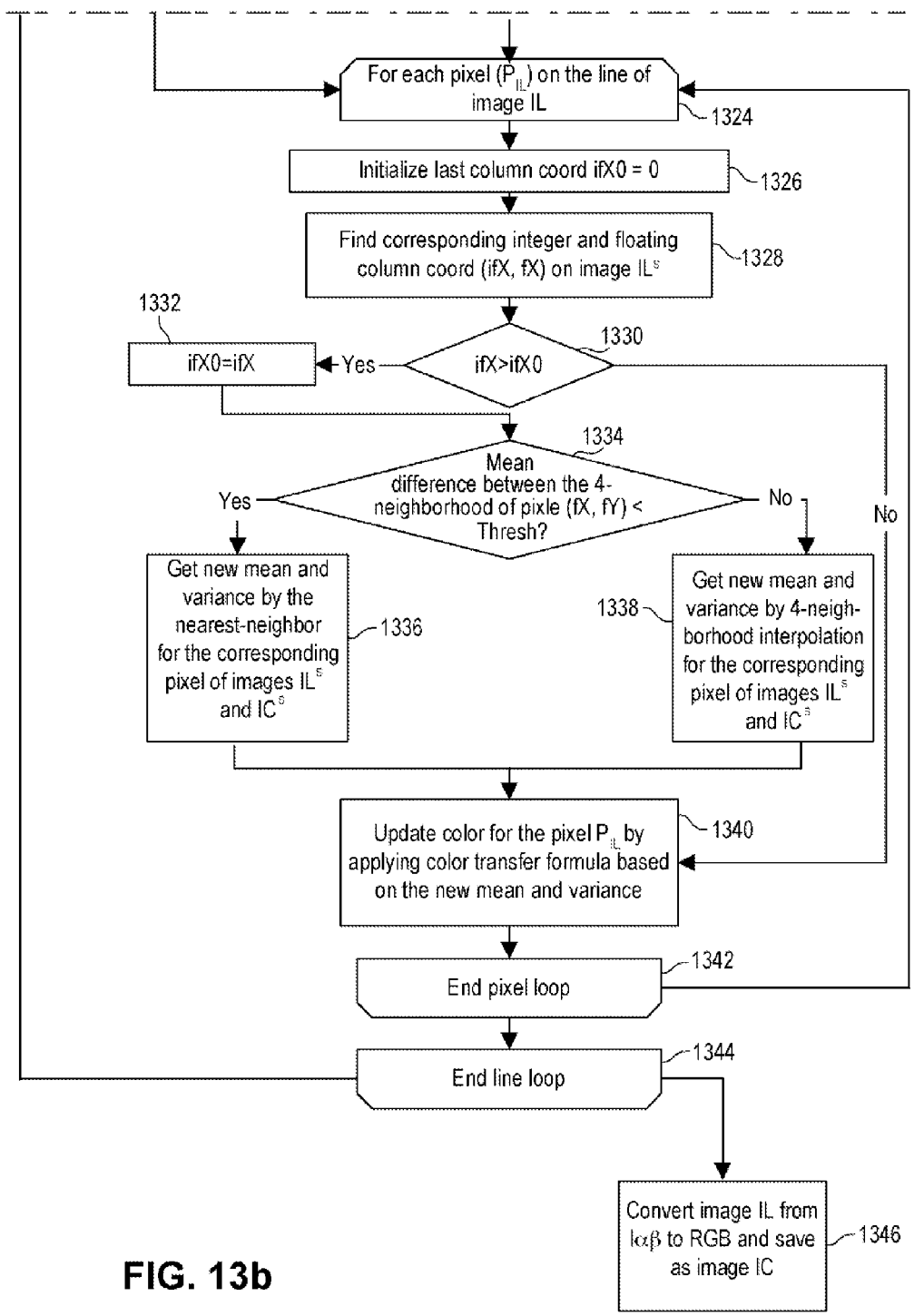

FIG. 13 is a flowchart of step 414 (FIG. 4) for local color transfer from small image $IC^s$ to large image IL in one embodiment of the invention.

In step 1302, the processor receives small images $IL^s$ and $IC^s$ and large image IL, where small image $IL^s$ is the downsized version of image IL and small image $IC^s$ is the deblurred image generated from small images $IL^s$ and $IH^s$ in step 412 (FIG. 4). Step 1302 is followed by step 1304.

In step 1304, the processor converts the color space of images IL, $IL^s$, and $IC^s$ from RGB to $l\alpha\beta$. Step 1304 is followed by step 1306.

In step 1306, the processor computes, for each pixel on line=1 in image IL, the sum and the square sum of each color channel within a 3*3 neighborhood-window on images $IL^s$ and $IC^s$. Step 1306 is followed by step 1308. Note that the process skips rows 1 and height−1, and columns 0 and width−1, because a neighborhood-window centered about a pixel on those rows or columns would have missing pixels.

In step 1308, the processor computes, for each pixel on line=1 in image $IL^s$, the mean and the variance of each color channel within the 3*3 neighborhood-window on images $IL^s$ and $IC^s$. The mean and the standard deviation (i.e., the square root of the variance) of the smaller size neighborhood on images $IL^s$ and $IC^s$ are used to approximate the mean and the standard deviation of a larger size neighborhood window on image IL in order to reduce the computation complexity. Step 1308 is followed by step 1310.

In step 1310, the processor initializes a last row coordinate ifY0 in image $IL^s$ to 0. Step 1310 is followed by step 1312.

In step 1312, the processor starts to loop through each line in image IL. Step 1312 is followed by step 1314.

In step 1314, the processor determines, for the current line in image IL, a corresponding integer row coordinate ifY and a floating point row coordinate fY in image $IL^s$ based on the ratio of downsizing image IL to $IL^s$. A corresponding integer is the next smallest integer about a floating point (e.g., the corresponding integer of floating point 3.8 is 3). Step 1314 is followed by step 1316.

In step 1316, the processor determines if integer row coordinate ifY is greater than last row coordinate ifY0. If so, then step 1316 is followed by step 1318. Otherwise step 1316 is followed by step 1324.

In step 1318, the processor sets last row coordinate ifY0 equal to integer row coordinate ifY. Step 1318 is followed by step 1320.

In step 1320, the processor computes, for each pixel on line=ifY in image IL, the sum and the square sum of each color channel within the 3*3 neighborhood-window on images $IL^s$ and $IC^s$ by the tumbling process. As described above, in the tumbling process, the processor adds a new line and subtracts an old line of the neighborhood-window. Step 1320 is followed by step 1322.

In step 1322, the processor computes, for each pixel on line=ifY in image IL, the mean and the variance for each color channel within the 3*3 neighborhood-window on images $IL^s$ and $IC^s$. Step 1322 is followed by step 1324.

In step 1324, the processor starts to loop through each pixel $P_{IL}$ on the current line of image IL. Step 1324 is followed by step 1326.

In step 1326, the processor initializes a last column coordinate ifX0 in image $IL^s$ to 0. Step 1326 is followed by step 1328.

In step 1328, the processor determines, for the current pixel $P_{IL}$ in image IL, the corresponding integer column coordinate ifX and floating column coordinate fX on image $IL^s$ based on the ratio of downsizing image IL to $IL^s$. Note that the current pixel $P_{IL}$ in image IL corresponds to pixel (fX, fY) in image $IL^s$. Step 1328 is followed by step 1330.

In step 1330, the processor determines if integer column coordinate ifX is greater than last column coordinate ifX0. If so, then step 1330 is followed by step 1332. Otherwise step 1330 is followed by step 1340.

In step 1332, the processor sets last column coordinate ifX0 equal to integer column coordinate ifX. Step 1332 is followed by step 1334.

In step 1334, the processor determines if the mean difference of the 4 neighboring pixels of pixel (fX, fY) in image $IL^s$ is less than a threshold Thresh. If the mean difference is less than the threshold Thresh, then the current location is assumed to be in an even area and step 1334 is followed by step 1336. Otherwise the current location is assumed to be in a bumpy area and step 1334 is followed by step 1338. A bump area is one with many image edges where color and/or luminance changes often. In one embodiment, threshold Thresh is set to 12. The following example is used to explain how the mean difference is calculated.

For a current pixel (fX, fY)=(x, y) in image $IL^s$, the 4 neighboring pixels are $Pixel_{x,y}$, $Pixel_{x+1,y}$, $Pixel_{x,y+1}$, and $Pixel_{x+1,y+1}$. The mean values of each of the 4 neighboring pixels within their 3*3 neighbor-windows are defined as:

$$\text{Mean}(x,y) = (l_{x,y}, \alpha_{x,y}, \beta_{x,y}); \qquad (18.1)$$

$$\text{Mean}(x+1,y) = (l_{x+1,y}, \alpha_{x+1,y}, \beta_{x+1,y}); \qquad (18.2)$$

$$\text{Mean}(x,y+1) = (l_{x,y+1}, \alpha_{x,y+1}, \beta_{x,y+1}); \qquad (18.3)$$

$$\text{Mean}(x+1,y+1) = (l_{x+1,y+1}, \alpha_{x+1,y+1}, \beta_{x+1,y+1}). \qquad (18.4)$$

The mean difference of the 4 neighboring pixels is then defined as:

$$\text{Mean difference} = |l_{x+1,y} + l_{x,y+1} + l_{x+1,y+1} - 3 \ast l_{x,y}| + \\ |\alpha_{x+1,y} + \alpha_{x,y+1} + \alpha \alpha_{x+1,y+1} - 3 \ast \alpha_{x,y}| + |\beta_{x+1,y} + \beta_{x,y+1} + \\ \beta_{x+1,y+1} - 3 \ast \beta_{x,y}|. \qquad (18.5)$$

In step 1336, the processor determines new means and new variances of pixel (fX, fY) using bilinear interpolation of the means and the variances of the 4 neighboring pixels on image $IL^s$ and $IC^s$. Step 1336 is followed by step 1340.

In step 1338, the processor determines new means and new variances of pixel (fX, fY) using 4-neighborhood mean interpolation on image $IL^s$ and $IC^s$. 4-neighborhood mean interpolation is a conventional image processing method. For example, assume 4 neighboring pixels of pixel (fX, fY) are pixels Pi,j, Pi+1,j, Pi+1, j+1, and Pi, j+1, interpolated mean for each color channel is defined as follows:

$$\text{Interpolated Mean} = dy \ast \text{value2} + (1-dy) \ast \text{value1}, \qquad (19)$$

$$\text{value1} = dx \ast \text{Mean}_{i+1,j} + (1-dx) \ast \text{Mean}_{i,j}, \qquad (20)$$

$$\text{value2} = dx \ast \text{Mean}_{i+1,j+1} + (1-dx) \ast \text{Mean}_{i,j+1}, \qquad (21)$$

$$dx = fx - i; \text{ and} \qquad (22)$$

$$dy = fy - j. \qquad (23)$$

Interpolated variance for each color channel is calculated using the same formulas. Step 1338 is followed by step 1340.

In step 1340, the processor updates the color of the current pixel $P_{IL}$ in image IL by applying color transfer formula (4) described above with the new means and the new standard deviations (i.e., the square roots of the new variances) of pixel (fX, fY) in image $IL^s$ determined in step 1336 or 1338. Specifically, the means and the standard deviations of image $IL^s$ are used as the target means and the standard deviations while the means and the standard deviations of image $IC^s$ are used as the source means and the source standard deviations in formula (4). Step 1340 is followed by step 1342.

In step 1342, the processor determines if all the pixels on the line have been processed. If not, then step 1342 is followed by step 1324. Otherwise step 1342 is followed by step 1344.

In step 1344, the processor determines if all the lines of image IL have been processed. If not, then step 1344 is followed by step 1312. Otherwise step 1344 is followed by step 1346.

In step 1346, the processor converts the color space of image IL from $l\alpha\beta$ back to RGB, saves the result as image IC, and then ends step 414.

Various other adaptations and combinations of features of the embodiments disclosed are within the scope of the invention. Numerous embodiments are encompassed by the following claims.

What is claimed is:

1. A computer-readable storage medium encoded with executable instructions for execution by a processor to generate a final image from a first image with a first exposure and a second image with a second exposure longer than the first exposure, the instructions comprising:

determining if the first and the second images are smaller than a threshold size;

when the first and the second images are smaller than the threshold size, using a deblurring procedure to generate the final image from the first and the second images;

when the first and the second images are not smaller than the threshold size:

saving the first and the second images at a size smaller than their original size as third and fourth images, respectively;

using the deblurring procedure to generate a fifth image from the third and the fourth images; and transferring color from the fifth image to the first image based on the third image to generate the final image;

displaying the final image.

2. The computer-readable storage medium of claim 1, wherein the first and the second images are smaller than the threshold size when a maximum length of the first and the second images is less than a threshold dimension, the maximum length being a greater of a width and a height of the first and the second images.

3. The computer-readable storage medium of claim 1, wherein said using the deblurring procedure comprises:

receiving first and second input images, wherein:

the first and the second input images are the first and the second images when the first and the second images are smaller than the threshold size; and the first and the second input images are the third and the fourth images when the first and the second images are not smaller than the threshold size;

determining if the first input image is brighter than the second input image;

when the first input image is brighter than the second input image, transferring color from the second input image to the first input image to generate the final image;

when the first input image is not brighter than the second input image:

globally aligning the first and the second input images;

adjusting saturation and luminance of the first input image based on the second input image to generate a first intermediate image;

customizing a histogram of the first intermediate image based on the second input image to generate a second intermediate image;

segmenting the second intermediate image into visually related regions;

locally aligning the regions in the second intermediate image to regions in the second input image;

adjusting color of the second intermediate image based on results of said globally aligning and said locally aligning to generate a third intermediate image; and transferring color from the third intermediate image to the first input image to generate the final image.

4. The computer-readable storage medium of claim 3, wherein said determining if the first input image is brighter than the second input image comprises:

determining a first mean of gray values of the first input image and a second mean of gray values of the second input images;

determining if the first mean of gray values is greater than a fixed percentage of the second mean of gray values;

wherein the first input image is brighter than the second input image when the first mean of gray values is greater than the fixed percentage of the second mean of gray values.

5. The computer-readable storage medium of claim 3, wherein said transferring color from the second input image to the first input image comprises:
- converting the first and the second input images from their original color space to lαβ color space where l represents an achromatic luminance channel, α represents a yellow-blue channel, and β represents a red-green channel;
- determining mean and variance values of each color channel in the first and the second input images;
- determining mapping tables based on the mean and the variance values;
- mapping the first input image with the mapping tables;
- convening the first input image from the lαβ color space back to the original color space;
- saving the first input image as the final image.

6. The computer-readable storage medium of claim 5, wherein said determining mapping tables based on the mean and the variance values comprises generating a mapping table for each color channel based on a color transfer formula defined as follows:

$$g(C_t) = \mu_s + \frac{\sigma_s}{\sigma_t}(C_t - \mu_t),$$

where $g(C_t)$ is a transferred color of a pixel in the first input image, $C_t$ is a color of a corresponding pixel in the second input image, $\mu_s$ and $\mu_t$ are the mean values of the color in the first and the second input images, respectively, and $\sigma_s$ and $\sigma_t$ are standard variation values determined from the variance values of the color in the first and the second input images, respectively.

7. The computer-readable storage medium of claim 3, prior to said globally aligning the first and the second input images, the instructions further comprise:
- determining a gamma correction factor from a first mean of gray values of the first input image and a second mean of gray values of the second input image;
- gamma correcting the first input image and the first mean of gray values using the gamma correction factor; and
- adjusting gray values of the second input image so the second mean of gray values is equal to the first mean of the gray values.

8. The computer-readable storage medium of claim 7, wherein:
the gamma correction factor is defined as:

$$\gamma = 1.0 + \frac{Mean_{IH} - Mean_{IL}}{Mean_{IL} \times 20} + \frac{Max\left(1.0, \frac{(42 - Mean_{IL}) * Mean_{IH}}{Mean_{IL}}\right)}{200},$$

where $\gamma$ is the gamma correction factor, $Mean_{IL}$ is the first mean of gray values of the first input image, and $Mean_{IH}$ is the second mean of gray values of the second input image; and
said gamma correcting the first input image and the first mean of gray values comprises using a table based on:

$$Gamma\ Table[i] = \frac{\left(i^{\frac{1}{\gamma}}\right)}{255^{\frac{1}{\gamma}}} \times 255, (i = 0, 1, \ldots, 255),$$

where GammaTable[i] represents a value in the table after gamma correction, and represents an original value prior to gamma correction.

9. The computer-readable storage medium of claim 7, wherein said adjusting gray values of the second input image comprises adding a difference of the first mean of gray values from the second mean of gray values to the gray values of the second input image.

10. The computer-readable storage medium of claim 3, wherein said globally aligning the first and the second input images comprises:
- looping through each step level, each step level comprising a step size and a search region:
  - looping through each displacement based on the step size in the search region:
    - determining an absolute gray error between the first and the second input images;
    - setting a displacement with a smallest absolute gray error as a best alignment for a current step level and a starting point for a next level.

11. The computer-readable storage medium of claim 3, wherein said adjusting saturation and luminance of the first input image comprises:
- determining gamma correction factors for the saturation and the luminance, wherein the gamma correction factors comprises:

$$\gamma = 1.0 + \frac{Mean_{IH} - Mean_{IL}}{Mean_{IL} \times 20} + \frac{Max\left(1.0, \frac{(42 - Mean_{IL}) * Mean_{IH}}{Mean_{IL}}\right)}{200},$$

$$\gamma_{saturation} = \min\left(1.23, \frac{\gamma - 1.0}{3.0} + 1.0\right),$$

$$\gamma_{luminance} = 1.0 + \frac{Mean_{IH} - Mean_{IL}}{Mean_{IH} \times 1.25},$$

where $\gamma$ is a gamma correction factor, $\gamma_{saturation}$ is the gamma correction factor for the saturation, $\gamma_{luminance}$ is the gamma correction factor for the luminance, $Mean_{IL}$ is a mean of gray values of the first input image, and $Mean_{IH}$ is a mean of gray values of the second input image;
- converting the first input image from its original color space to HSL color space;
- applying gamma correction to the first input image using a table based on:

$$Gamma\ Table[i] = \frac{\left(i^{\frac{1}{\gamma}}\right)}{255^{\frac{1}{\gamma}}} \times 255, (i = 0, 1, \ldots, 255),$$

where GammaTable[i] represents a value in the table after gamma correction, and i represents an original value prior to gamma correction;
- convening the first input image from the HSL color space to the original color space and saving the first input image as the first intermediate image.

12. The computer-readable storage medium of claim 3, wherein said customizing a histogram of the first intermediate image comprises:
- normalizing color channels of the first intermediate image and the second input image in their overlapping areas determined from said globally aligning;

determining histograms of the color channels of the first intermediate image and the second input image in the overlapping areas;

smoothing the histograms;

building channel mapping tables that map the histograms of the second input image to the histograms of the first intermediate image by histogram specification;

inverse normalizing the channel mapping tables; and mapping the first intermediate image with the channel mapping tables to generate the second intermediate image.

13. The computer-readable storage medium of claim 3, wherein said locally aligning the regions in the second intermediate image to regions in the second input image comprises:

looping through each step level, each step level comprising a step size and a search region size:

looping through each displacement based on the step size in the search region:

looping through each region in the second intermediate image:

determining an absolute gray error between the region in the second intermediate image and a corresponding region in the second input image;

setting a displacement with a smallest absolute gray error as a best alignment of the region.

14. The computer-readable storage medium of claim 3, wherein said adjusting color of the second intermediate image comprises:

looping through each pixel in the second intermediate image:

determining a first absolute color error between the pixel and a first corresponding pixel in the second input image locally aligned with the pixel by said locally aligning;

determining if the first absolute color error is less than a first threshold;

when the first absolute color error is less than the first threshold:

determining a first weak-sorting color error between the pixel and the first corresponding pixel;

determining if a first combination of the first absolute color error and the first weak-sorting color error is less than a second threshold;

when the first combination of the first absolute color error and the first weak-sorting color error is less than the second threshold, setting the color of the pixel equal to the color of the first corresponding pixel.

15. The computer-readable storage medium of claim 14, further comprising:

when the first combination of the first absolute color error and the first weak-sorting color error is not less than the second threshold:

determining a second absolute color error between the pixel and a second corresponding pixel in the second input image globally aligned with the pixel by said globally aligning;

determining if the second absolute color error is less than the first threshold;

when the second absolute color error is less than the first threshold:

determining a second weak-sorting color error between the pixel and the second corresponding pixel;

determining if a second combination of the second absolute color error and the second weak-sorting color error is less than the second threshold;

when the second combination of the second absolute color error and the second weak-sorting color error is less than the second threshold, setting the color of the pixel equal to the color of the second corresponding pixel.

16. The computer-readable storage medium of claim 15, the instructions further comprise:

when the first absolute color error is not less than the first threshold:

determining the second absolute color error between the pixel and the second corresponding pixel;

determining if the second absolute color error is less than the first threshold;

when the second absolute color error is less than the first threshold:

determining the second weak-sorting color error between the pixel and the second corresponding pixel;

determining if the second combination of the second absolute color error and the second weak-sorting color error is less than the second threshold;

when the second combination of the second absolute color error and the second weak-sorting color error is less than the second threshold, setting the color of the pixel equal to the color of the second corresponding pixel.

17. The computer-readable storage medium of claim 15, wherein the first and the second weak-sorting color errors are each defined as:

$$E2 = \text{sign}\,(C_s^1 * 2 - C_s^2 - C_s^3) + \text{sign}\,(C_s^1 + C_s^2 - C_s^3 * 2);$$

$$\text{sign}(x) = \begin{cases} 1, \text{if } x \geq 0 \\ 0, \text{Otherwise} \end{cases};$$

where E2 is a corresponding weak-sorting color error, color channels ($R_t$, $G_t$, $B_t$) of the pixel in the second intermediate image are sorted in descending order as ($C^1_t$, $C^2_t$, $C^3_t$), and color channels ($R_s$, $G_s$, $B_s$) of the first or the second corresponding pixel in the second input image are sorted in a same corresponding descending order as ($C^1_s$, $C^2_s$, $C^3_s$).

18. The computer-readable storage medium of claim 17, wherein the first and the second combinations are each defined as:

$$E_{total} = (3 - E2) * E1;$$

where $E_{total}$ is a combination of the first or the second absolute error and the first or the second weak-sorting color error, E1 is the first or the second absolute error, and E2 is the first or the second weak-sorting color error.

19. The computer-readable storage medium of claim 3, wherein said transferring color from the third intermediate image to the first input image to generate the final image comprises:

converting the first input image and the third intermediate image from their original color space to $l\alpha\beta$ color space where l represents an achromatic luminance channel, $\alpha$ represents a yellow-blue channel, and $\beta$ represents a red-green channel;

looping through each size of a neighborhood-window:
   looping through each pixel of a plurality of pixels in the first input image and the third intermediate image:
      determining mean and variance values of each color channel from neighboring pixels in the neighborhood-window in the first input image and corresponding neighboring pixels in the neighborhood-window in the third intermediate image;
      applying a color transfer based on the mean and the variance values to the pixel;
   convening the first input image from the lαβ color space back to the original color space;
   saving the first input image as the final image.

20. The computer-readable storage medium of claim 19, wherein the size of the neighborhood-window ranges from 7*7 to 5*5 to 3*3.

21. The computer-readable storage medium of claim 19, wherein said applying a color transfer comprises:

$$g(C_t) = \mu_s + \frac{\sigma_s}{\sigma_t}(C_t - \mu_t),$$

where $g(C_t)$ is a transferred color of a pixel in the first input image, $C_t$ is the color of a corresponding pixel in the third intermediate image, $\mu_s$ and $\mu_t$ are the mean values of the first input image and the third intermediate image, respectively, and $\sigma_s$ and $\sigma_t$ are standard variation values determined from the variance values of the first input image and the third intermediate image, respectively.

22. The computer-readable storage medium of claim 1, wherein said transferring color from the fifth image to the first image comprise:
   convening the first image, the third image, and the fifth image from their original color space to lαβ color space where l represents an achromatic luminance channel, α represents a yellow-blue channel, and β represents a red-green channel;
   looping through each pixel of a plurality of pixels in the first image:
      determining mean and variance values of each color channel of neighboring pixels of a corresponding pixel in the third image and neighboring pixels of a corresponding pixel in the fifth image;
      determining a mean difference between the pixel and its four closest neighboring pixels in the third image;
      when the mean difference is less than a threshold, determining new mean and new variance values based on bilinear interpolation of mean and variance values of the four closest neighbors in the third and the fifth images;
      when the mean difference is not less than the threshold, determining the new mean and the new variance values based on 4-neighborhood interpolation of mean and variance values of the four closest neighbors in the third and the fifth images;
      applying a color transfer based on the new mean and the new variance values to the pixel;
   converting the first image from the lαβ color space back to the original color space; and
   saving the first image as the final image.

23. The computer-readable storage medium of claim 22, wherein the mean difference is defined as:

mean difference=$|l_{x+1,y}+l_{x,y+1}l_{x+1,y+1}-3l_{x,y}|+|\alpha_{x+1,y}+\alpha_{x,y+1}+\alpha\alpha_{x+1,y+1}-3*\alpha_{x,y}|+|\beta_{x+1,y}+\beta_{x,y+1}+\beta_{x+1,y+1}-3*\beta_{x,y}|$, where $(l_{x,y}, \alpha_{x,y}, \beta_{x,y})$, $(l_{x+1}, \alpha_{x+1,y}, \beta_{x+1,y})$, $(l_{x,y+1}, \alpha_{x,y+1}, \beta_{x,y+1})$, and $(l_{x+1,y+1}, \alpha_{x+1,y+1}, \beta_{x+1,y+1})$ are four mean values of four neighboring pixel windows centered about the four closest neighboring pixels.

24. The computer-readable storage medium of claim 23, wherein said applying a color transfer comprises:

$$g(C_t) = \mu_s + \frac{\sigma_s}{\sigma_t}(C_t - \mu_t),$$

where $g(C_t)$ is a transferred color of a pixel in the first image, $C_t$ is the color of a corresponding pixel in the third image, $\mu_s$ and $\mu_s$ are the new mean values of the fifth image and the third image, respectively, and $\sigma_s$ and $\sigma_t$ are standard variation values determined from the new variance values of the fifth image and the third image, respectively.

\* \* \* \* \*

UNITED STATES PATENT AND TRADEMARK OFFICE
CERTIFICATE OF CORRECTION

PATENT NO. : 7,680,354 B2  
APPLICATION NO. : 11/419733  
DATED : March 16, 2010  
INVENTOR(S) : Li Mei Page 1 of 1

It is certified that error appears in the above-identified patent and that said Letters Patent is hereby corrected as shown below:

Column 17,
Line 14, Claim 5, where "convening" should read --converting--.

Column 18,
Line 2, Claim 8, where "and represents" should read --and i represents--.

Column 21,
Line 11, Claim 19, where "convening" should read --converting--.

Column 22,
Line 22, Claim 23, where "mean difference = | lx+1,y + lx,y+1lx+1,y+1 − 3lx,y |" should read --mean difference = | lx+1,y + lx,y+1 + lx+1,y+1 − 3*lx,y |--.

Column 22,
Lines 37 and 38, Claim 24, where "μs and μs" should read --μs and μt--.

Signed and Sealed this
Twenty-second Day of February, 2011

David J. Kappos
*Director of the United States Patent and Trademark Office*